(12) United States Patent
Wade

(10) Patent No.: US 8,473,389 B2
(45) Date of Patent: Jun. 25, 2013

(54) METHODS AND SYSTEMS OF PURCHASE CONTRACT PRICE ADJUSTMENT CALCULATION TOOLS

(75) Inventor: Laura Kimberly Wade, Seabeck, WA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 600 days.

(21) Appl. No.: 12/352,054

(22) Filed: Jan. 12, 2009

(65) Prior Publication Data
US 2010/0179898 A1    Jul. 15, 2010

(51) Int. Cl.
*G06Q 40/00* (2006.01)
(52) U.S. Cl.
USPC ............. 705/35; 705/37; 705/7; 705/27.1; 705/32; 705/34; 705/320; 705/400; 707/2; 715/212
(58) Field of Classification Search
USPC ............. 715/212; 707/2; 705/27, 17, 40, 705/34, 32, 320, 400, 35, 37
See application file for complete search history.

(56) References Cited

U.S. PATENT DOCUMENTS

| | | | |
|---|---|---|---|
| 6,751,650 B1 | 6/2004 | Finch, II et al. | |
| 6,912,508 B1 | 6/2005 | McCalden et al. | |
| 7,233,971 B1 | 6/2007 | Levy | |
| 7,379,907 B2 | 5/2008 | Dang et al. | |
| 7,426,486 B2 | 9/2008 | Treibach-Heck et al. | |
| 7,433,855 B2 | 10/2008 | Gavan et al. | |
| 7,818,661 B2 * | 10/2010 | Patel | 715/212 |
| 2002/0184148 A1 * | 12/2002 | Kahn et al. | 705/40 |
| 2003/0216978 A1 | 11/2003 | Sweeney et al. | |
| 2004/0083165 A1 | 4/2004 | Lawrence | |
| 2004/0267595 A1 | 12/2004 | Woodings et al. | |
| 2006/0242042 A1 | 10/2006 | Qin et al. | |
| 2008/0077503 A1 | 3/2008 | Zias et al. | |

OTHER PUBLICATIONS

Contractor's Handbook for Constuction Contracts; Developed for the Chesapeake Division Naval Facilities Engineering Command Washington. D.C. 20374; 1988.*
"Making Davis-Bacon Work";A Contractor's Guide to Prevailing Wage Requirements for Federally-Assisted Construction Projects; Jun. 2006; U.S. Department of Housing and Urban Development.*
Contractors Handbook for Constuction Contracts; Developed for the Chesapeake Division Naval Facilities Engineering Command Washington. D.C. 20374; 1988.*
Service Contract Act of 1965, As Amended (Jan 2006).*

(Continued)

*Primary Examiner* — Harish T Dass
(74) *Attorney, Agent, or Firm* — Amy Ressing; John Leonard Young

(57) ABSTRACT

Allowability, allocability and adjustment of contract prices are determined using a computer system, based on SERVICE CONTRACT ACT wage determination rules. Upon receiving a request for a contract price adjustment from a contractor, the contractor is required to submit the proposed price adjustment in an electronic spreadsheet format. Information from the spreadsheet is stored and made available electronically to the program. If the proposed price adjustment contains DAVIS BACON ACT hours, then the DBA hours are filtered using a governing wage determination raw data field for separate calculations using applicable rules and regulations. Payroll taxes and appropriate adjustment entitlement values are automatically calculated and the program determines, appropriate price adjustments. Pivot tables are used to summarize and visualize the adjustments and helpful tips are provided on worksheets for ease of understanding and confirming allowability, allocability and accuracy of the request for price adjustment.

15 Claims, 22 Drawing Sheets

OTHER PUBLICATIONS

The Davis-Bacon Act, Desktop Guide, Feb. 2006.*

American Bar Association, Labor and Employment Section, Fair Labor Standards Legislation Committe;Terry R. Yellig, et al.; 2003 Government Contracts Subcommittee Report; pp. 1-10; 2003; [Accessed on the Internet] <hitp://www.bnabooks.com/ababna/flsa/2003/yellig.doc>.

CCH Inc.; Federal Acquisition Regulation: 52.222-43 Fair Labor Standards Act and Service Contract Act-Price Adjustment (Multiple Year and Option Contracts); pp. 1360-1361; Jan. 1, 2005; Chicago. (this regulation consists of the same material incorporated by reference in the instant application, for which this IDS is submitted).

CCH Inc.; Federal Acquisition Regulation: 52.222-44 Fair Labor Standards Act and Service Contract Act-Price Adjustment; pp. 1361-1362; Jan. 1, 2005; Chicago. (this regulation consists of the same material incorporated by reference in the instant application, for which this IDS is submitted).

CCH Inc.; Federal Acquisition Regulation: Subpart 22.4-Labor Standards for Contracts Involving Construction; pp. 499-519; Jan. 1, 2005; Chicago. (this regulation consists of the same material incorporated by reference in the instant application, for which this IDS is submitted).

CCH Inc.; Federal Acquisition Regulation: Subpart 22.10-Service Contract Act of 1965, As Amended; pp. 527-545; Jan. 1, 2005; Chicago. (this regulation consists of the same material incorporated by reference in the instant application, for which this IDS is submitted).

CCH Inc.; Department of Defense Far Supplement: Subpart 222.4-Labor Standards for Contracts Involving Construction; pp. 220- 226; Jan. 1, 2005; Chicago. (this regulation supplement consists of the same material incorporated by reference in the instant application, for which this Ids is submitted).

CCH Inc.; Department of Defense Far Supplement: Subpart 222.10-Service Contract Act of 1965, As Amended; pp. 226-227; Jan. 1, 2005; Chicago. (this regulation supplement consists of the same material incorporated by reference in the instant application, for which this IDS is submitted).

United States Department of the Navy; unknown.; Desk Guide for Service Contract Price Adjustments: Service Contract Act and Fair Labor Standards Act; pp. 1-44; Jan. 2007; United States Department of the Navy. (this Desk Guide consists of the same material incorporated by reference in the instant application, for which this IDS is submitted).

United States Air Force; unknown.; The Service Contract Act Desktop Guide; pp. 1-20; May 2007; United States Air Force Labor Advisors Office (SAF/AQCK).

Pentagon, Navy Labor Advisor; Frank Dean; Statement of Support for PACTp [e-mail correspondence]; pp. 1-2; May 15, 2008 7:41 (ZULU); Pentagon, Washington, DC.

Navfac; Laura K. Wade; SCA Price Adjustment Tool-prototype demo (with Slides) [e-mail correspondence]; pp. 1-4; Jun. 3, 2008 16:52 (ZULU); Silverdale, WA.

Navfac; Laura K. Wade; Flow-Chart/Process Map for SCA Price Adjustment Calculation Tool-prototype (Slide) [e-mail correspondence]; pp. 1-2; Jun. 4, 2008 16:48 (ZULU); Silverdale, WA.

Navfac; Laura K. Wade; Service Contract Act Price Adjustment Calculation Tool prototype (PACTp) [e-mail correspondence]; pp. 1-3; Jun. 17, 2008 4:41 PM; Silverdale, WA.

Navfac; Laura K. Wade; Common Oversights within SCA Price Adjustments [e-mail correspondence]; pp. 1-7; Jun. 17, 2008 8:34 AM; Silverdale, WA.

Pentagon, Navy Labor Advisor; Frank Dean; Service Contract Act Price Adjustment Tool (and BTA cantact) [e-mail correspondence]; pp. 1-3; Jun. 18, 2008 4:29 (Zzulu); Pentagon, Washington, DC.

Navfac; Laura K. Wade; Poam, Summary and cost savings to the Gov on PACTp (and spreadsheets) [e-mail correspondence] ; pp. 1-8; Aug. 21, 2008 8:45 PM; Silverdale, WA.

Navfac; Laura K. Wade; Lockheed Martin Project Support [e-mail correspondence]; pp. 1-2; Oct. 6, 2008 2:25 PM; Silverdale, WA.

Navfac; Laura K. Wade; Cost savings of PACTp shown in Lackland Field Testing [e-mail correspondence]; pp. 1-2; Oct. 10, 2008 3:42 PM; Silverdale, WA.

The Davis-Bacon Act, as Amended, Public Law 107-217-Aug, 21, 2002, pp. 1 & 2, United States Congress, USA.

Service Contract Act of 1965, Required contract provisions; minimum wages, 41 USC 351, p. 1, United States Congress, USA.

Federal Acquisition Regulation (FAR) 52.222-44 Fair Labor Standards Act and Service Contract Act—Price Adjustment, p. 1, (Sep 2009) United States Printing Office, USA.

Far 52.222-43 Fair Labor Standards Act and Service Contract Act—Price Adjustment (Multiple Year Option Contracts), pp. 1 & 2, (Sep 2009) United States Printing Office, USA.

Far 52.222-32 Davis-Bacon Act—Price Adjustment (Actual Method), pp. 1 & 2, (Dec. 2001) United States Printing Office, USA.

Far 52.222-8 Payrolls and Basic Records, pp. 1 & 2, (Jun. 2010) United States Printing Office, USA.

DoD Financial Management Regulation vol. 6B, Chapter 5, Summary of Major Changes to DOD 7000.14-R vol. 6B, Chapter 5 "Statement of Net Cost", pp. 1-13, (May 2012) USA.

Far Part 31, Unallowable Costs, US Government Contracts Management, pp. 1-3, USA.

Guzman, Serjio C., Subject: RE: FEC SME Invitation to Intensive Price Adjustment Training, Wednesday, Nov. 10, 2010 12:39 PM, pp. 1-3, [Internet: email], USA.

Wage Determinations OnLine.gov (Website); Pact (TM) (Price Adjustment Calculation Tool) New1 (with description by U.S. Naval Research Laboratory Office of Associate Counsel); Apr. 29, 2011; pp-4; published by the U. S. Department of Labor; Washington, DC [Accessed via the Internet on Apr. 29, 2011 at: http://www.wdol.gov].

* cited by examiner

| Sum of Total Adjustment Entitlement | | | | | | | | | | | |
|---|---|---|---|---|---|---|---|---|---|---|---|
| Annex | ELIN | Governing WD | Labor Category | Employee | Actual Wage Paid | New Required Min Wage | Actual Fringe Paid | New Required Min Fringe | OT SCALE | # of hours | Total |
| 0200 | 02EJB | CBA | DATA ENTRY CLERK | Snoop Dog | $14.21 | $14.64 | $5.16 | $5.62 | 1 | 39.00 | $35.99 |
| | | | | | | | | | | 972.40 | $897.42 |
| | | | DRIVER, HEAVY MOTOR VEHICLE(B) | Will Smith | $19.20 | $19.78 | $5.16 | $5.62 | 1 | 6.00 | $6.51 |
| | | | GENERAL MAINTENANCE WORKER | George Jones | $22.42 | $23.09 | $5.16 | $5.62 | 1 | 2.00 | $2.36 |
| | | | LABORER | Merle Haggard | $14.98 | $15.43 | $5.16 | $5.62 | 1.5 | 1.50 | $1.42 |
| | | | | Reba McIntyre | $14.98 | $15.43 | $5.16 | $5.62 | 1 | 1.50 | $1.42 |
| | | | MECHANIC, HVAC | Willy Nelson | $23.44 | $24.14 | $5.16 | $5.62 | 1 | 2.00 | $2.43 |
| | | | MOTOR POOL DISPATCHER | Michael Bolton | $15.88 | $16.36 | $5.16 | $5.62 | 1 | 355.00 | $346.74 |
| | | | | | | | | | 2 | 9.00 | $8.79 |
| | | | SERVICE DESK OPERATOR | Miranda Lambert | $15.15 | $15.60 | $5.16 | $5.62 | 1 | 2.50 | $2.36 |
| | | | | | | | | | | 450.50 | $425.46 |
| 02EJB Total | | | | | | | | | | | $1,730.90 |
| ANX 2 | DBA | | DB-CEMENT MASON | Hannah Montana | $30.69 | $32.69 | | $5.62 | 1 | 4.50 | $0.00 |
| | | | DB-ELECTRICIAN | Tom Jones | $34.50 | $36.93 | | $5.62 | 1 | 2.00 | $0.00 |

FIG. 5

| Sum of Total Adjustment Entitlement | | | | | | |
|---|---|---|---|---|---|---|
| Employee | Annex | ELIN | Governing WD | Labor Category | Actual Wage Paid | New Required Min Wage |
| (blank) | (blank) | (blank) | (blank) | (blank) | (blank) | (blank) |
| (blank) Total | | | | | | |
| George Jones | 1520 | 015AG | DBA | DB-BOILERMAKER | $27.80 | $27.80 |
| | | | | DB-CARPENTER/DRYWL.APPLICATOR | $27.80 | $30.34 |
| | | | | | $30.34 | $30.34 |
| | | | | DB-PLUMBER/PIPFTR KITSAP | $22.59 | $22.59 |
| | | | | DB-SHEETMETAL WRKR | $33.48 | $34.24 |
| George Jones Total | | | | | | |
| Tom Jones | 0200 | ANX 2 | DBA | DB-ELECTRICIAN | $34.50 | $36.93 |
| | 1520 | 015AG | DBA | DB-ELECTRICIAN | $34.50 | $36.93 |
| Tom Jones Total | | | | | | |
| Thelonious Monk | 0200 | ANX 2 | DBA | DB-ELECTRICIAN | $34.50 | $36.93 |
| | 1520 | 015AG | DBA | DB-ELECTRICIAN | $34.50 | $36.93 |
| Thelonious Monk Total | | | | | | |
| Hannah Montana | 0200 | ANX 2 | DBA | DB-CEMENT MASON | $30.69 | $32.69 |
| | 1520 | 015AF | DBA | DB-CEMENT MASON | $30.69 | $32.69 |
| | | 015AG | | DB-CEMENT MASON | $30.69 | $32.69 |
| Hannah Montana Total | | | | | | |
| Bob Dylan | 0200 | ANX 2 | DBA | DB-ELECTRICIAN | $34.50 | $36.93 |
| | 1520 | 015AG | DBA | DB-ELECTRICIAN | $34.50 | $36.93 |
| Bob Dylan Total | | | | | | |

FIG. 6

| Governing WD | Labor Category | Employee | Actual Wage Paid | New Required Min Wage | Actual Fringe Paid |
|---|---|---|---|---|---|
| DBA | DB-BOILERMAKER | George Jones | $27.80 | $27.80 | $5.16 |
| | DB-CARPENTER/DRYWL.APPLICATOR | George Jones | $27.80 | $30.34 | $5.16 |
| | | Hannah Montana | $30.34 | $30.34 | $5.16 |
| | DB-CEMENT MASON | Janet Jackson | $30.69 | $32.69 | $5.16 |
| | DB-DRYWALL FINISHER | Tom Jones | $28.61 | $30.61 | $5.16 |
| | DB-ELECTRICIAN | Thelonious Monk | $34.50 | $36.93 | $5.16 |
| | | Bob Dylan | $34.50 | $36.93 | $5.16 |
| | | Lena Horn | $34.50 | $36.93 | $5.16 |
| | DB-PAINTER/DRYWALL TAPER | Janet Jackson | $19.46 | $19.91 | $5.16 |
| | DB-PLUMBER/PIPFTR KITSAP | George Jones | $22.59 | $22.59 | $5.16 |
| | | Willy Nelson | $22.59 | $22.59 | $5.16 |
| | | Janet Jackson | $22.59 | $22.59 | $5.16 |
| | DB-SHEETMETAL WRKR | George Jones | $33.48 | $34.24 | $5.16 |
| | | Willy Nelson | $33.48 | $34.24 | $5.16 |
| DBA Total | | | | | |

FIG. 7

| Sum of # of hours | | | | | | |
|---|---|---|---|---|---|---|
| Governing WD | Employee | Employee ID (unique identifier) | Labor Category | ELIN | Actual Wage Paid | New Required Min Wage |
| CBA | Aretha Franklin | 659794 | MAINTENANCE ELECTRICIAN | 015AH | $25.18 | $25.94 |
| | Art Garfunkel | 649464 | MAINTENANCE MECHANIC | 015AH | $23.44 | $24.14 |
| | Billy Holiday | 749440 | OPERATOR, HEAVY EQUIPMENT | 015AH | $23.44 | $24.14 |
| | Bob Dylan | 697808 | ELECTRICIAN, HIGH VOLTAGE | 016AB | $30.29 | $31.20 |
| | Bob Marley | 649468 | STATIONARY ENGINEER | 016AF | $23.44 | $24.14 |
| | Bon Jovi | 666866 | SERVICE DESK OPERATOR | ANX 2 | $15.15 | $15.60 |
| | Boy George | 649690 | MAINTENANCE ELECTRICIAN | 015AF | $25.18 | $25.94 |
| | Britney Spears | 649689 | DRIVER, BUS | ANX 2 | $18.25 | $18.80 |
| | Carrie Underwood | 349444 | MECHANIC, STEAM MAINTENANCE | 015AH | $23.44 | $24.14 |
| | Celine Dion | 349445 | MECHANIC, BODY/FENDER | ANX 2 | $23.44 | $24.14 |
| | Cher | 680945 | MECHANIC, POWER GENERATION EQP | 016AB | $25.18 | $25.94 |
| | Dolly Pardon | 649444 | STOREKEEPER | 010AA | $17.84 | $18.38 |
| | Donna Summers | 649667 | MAINTENANCE ELECTRICIAN | 015AF | $25.18 | $25.94 |
| | Eddie Van Halen | PT-649949 | DRIVER, MAIL DISTRIBUTION | 010AC | $16.75 | $17.25 |
| | Eddie Vetter | 649486 | MECHANIC, STEAM MAINTENANCE | 015AJ | $23.44 | $24.14 |
| | Elton John | 649487 | DRIVER, BUS | 017AA | $18.25 | $18.80 |
| | Gene Simmons | 699448 | MECHANIC, HVAC | 015AH | $23.44 | $24.14 |
| | George Jones | 649688 | GENERAL MAINTENANCE WORKER | ANX 2 | $22.42 | $23.09 |
| | Hannah Montana | 649405 | ROOF REPAIRER | 015AF | $22.42 | $23.09 |
| | James Brown | 679665 | MECHANIC, HEAVY DUTY & DIESEL | ANX 2 | $23.66 | $24.37 |
| | James Taylor | PT-697560 | JANITOR | 014AA | $13.90 | $14.32 |
| | Janet Jackson | 649456 | MAINTENANCE PAINTER | 014AB | $22.42 | $23.09 |
| | Janis Joplin | PT-699978 | LABORER, SEASONAL | 014AC | $11.67 | $12.02 |

| Employee | Annex | ELIN | Labor Category | Actual Wage Paid | New Required Min Wage | Actual Fringe Paid |
|---|---|---|---|---|---|---|
| Bob Dylan | 0200 | ANX 2 | DB-ELECTRICIAN | 34.5 | 36.93 | 5.16 |
| | 1520 | 015AG | DB-ELECTRICIAN | 34.5 | 36.93 | 5.16 |
| Bob Dylan Total | | | | | | |
| George Jones | 1520 | 015AG | DB-BOILERMAKER | 27.8 | 27.8 | 5.16 |
| | | | DB-CARPENTER/DRYWL.APPLICATOR | 27.8 | 30.34 | 5.16 |
| | | | | 30.34 | 30.34 | 5.16 |
| | | | DB-PLUMBER/PIPFTR KITSAP | 22.59 | 22.59 | 5.16 |
| | | | DB-SHEETMETAL WRKR | 33.48 | 34.24 | 5.16 |
| George Jones Total | | | | | | |
| Hannah Montana | 0200 | ANX 2 | DB-CEMENT MASON | 30.69 | 32.69 | 5.16 |
| | 1520 | 015AF | DB-CEMENT MASON | 30.69 | 32.69 | 5.16 |
| | | 015AG | DB-CEMENT MASON | 30.69 | 32.69 | 5.16 |
| Hannah Montana Total | | | | | | |
| Janet Jackson | 1520 | 015AG | DB-PAINTER/DRYWALL TAPER | 19.46 | 19.91 | 5.16 |
| | | 015AK | DB-DRYWALL FINISHER | 28.61 | 30.61 | 5.16 |
| | | | DB-PAINTER/DRYWALL TAPER | 19.46 | 19.91 | 5.16 |
| | | | DB-PLUMBER/PIPFTR KITSAP | 22.59 | 22.59 | 5.16 |
| Janet Jackson Total | | | | | | |
| Lena Horn | 1420 | 014AH | DB-ELECTRICIAN | 34.5 | 36.93 | 5.16 |
| | 1520 | 015AG | DB-ELECTRICIAN | 34.5 | 36.93 | 5.16 |
| Lena Horn Total | | | | | | |

FIG. 10

| Sum of Total Adjustment Entitlement | | | | | | | | | |
|---|---|---|---|---|---|---|---|---|---|
| Annex | ELIN | | Labor Category | Employee | Actual Wage Paid | New Required Min Wage | Actual Fringe Paid | New Required Min Fringe | # of hours | Total |
| 0200 | ANNEX 2 | | DB-CEMENT MASON | Hannah Montana | 30.69 | 32.69 | 5.16 | 5.62 | 4.5 | $23.52 |
| | | | DB-ELECTRICIAN | Bob Dylan | 34.5 | 36.93 | 5.16 | 5.62 | 2 | $12.30 |
| | | | | Thelonious Monk | 34.5 | 36.93 | 5.16 | 5.62 | 2.5 | $15.38 |
| | | | | Tom Jones | 34.5 | 36.93 | 5.16 | 5.62 | 2 | $12.30 |
| ANNEX 2 Total | | | | | | | | | | $63.50 |
| 0200 Total | | | | | | | | | | $63.50 |
| 1420 | 014AH | | DB-ELECTRICIAN | Lena Horn | 34.5 | 36.93 | | 5.62 | 5 | $30.76 |
| 014AH Total | | | | | | | | | | $30.76 |
| 1420 Total | | | | | | | | | | $30.76 |
| 1520 | 015AF | | DB-CEMENT MASON | Hannah Montana | 30.69 | 32.69 | 5.16 | 5.62 | 6.5 | $33.97 |
| 015AF Total | | | | | | | | | | $33.97 |
| | 015AG | | DB-BOILERMAKER | George Jones | 27.8 | 27.8 | 5.16 | 5.62 | -2 | -$1.84 |
| | | | DB-CARPENTER/DRYWL.APPLICATOR | George Jones | 27.8 | 30.34 | 5.16 | 5.62 | 2 | $12.78 |
| | | | | | 30.34 | 30.34 | 5.16 | 5.62 | 8 | $7.36 |
| | | | | | | | | | 19 | $17.48 |
| | | | DB-CEMENT MASON | Hannah Montana | 30.69 | 32.69 | 5.16 | 5.62 | 4 | $20.90 |
| | | | DB-ELECTRICIAN | Bob Dylan | 34.5 | 36.93 | 5.16 | 5.62 | 2 | $12.30 |
| | | | | Lena Horn | 34.5 | 36.93 | 5.16 | 5.62 | 7.5 | $46.14 |
| | | | | | | | | | 111.5 | $685.92 |
| | | | | Thelonious Monk | 34.5 | 36.93 | | 5.62 | 2.5 | $15.38 |

FIG. 11

TOTAL ADJUSTMENT Entitlement (capturing multiple criteria for DBA calculations, OT and straight time)-Odd #'d WD =IF(E11="DBA",(IF((G11+I11)>=(H11+J11),0,((H11+J11)-(G11+I11))*K11)+(SUM(M11:O11)),IF(L11>1,((H11-G11)*K11)+SUM(M11:O11),

| Governing WD = DBA | checks that combo of new required rates is greater than the combo of old actual rates | If it isn't it inserts zero | If it is, it calculates (new wage +new h&w)- (old wage+ old h&w) +payroll taxes | OT scale is greater than 1 | new wage req - old actual | Hours | Payroll taxes |

The IF(E11="DBA", section of the formula screens for Davis Bacon.
If you compare it to the one on the Davis Bacon Breakout spreadsheet, it is the same.

This is the next logic test applied. It checks for OT hours, and only applies a wage adjustment to them instead of both the H&W and Wage adjustments.

IF(L11=1,((H11-G11)+(J11-I11))*K11)+SUM(M11:O11)))

OT scale=1    wage adjust h&w adjust  hours    payroll taxes

This formula is shown here on its own line, when in actuality; there is no space in the formula in Excel.
This is the last test applied to look for non-DB hours, that are not overtime hours. They get both the wage and H&W adjustment using SCA rules.

FIG. 12

CONTRACTOR SUBMISSION FORMAT:

Please use the format displayed in the sample below for submitting data for the Price Adjustment Proposal.

*NOTE* There are multiple rows of data per employee. When an employee performs work in more than one labor category, charges time to more than one Annex or ELIN, or works both straight time and overtime, there should be a corresponding row of data reflective of each of those instances. Identify Shift Pay in the Labor Category column as applicable by adding SD1-Swing Shift, SD2-Graveyard/Mid-Shift, SD3- Rotating Shift as shown below.

WORKSHEET INSTRUCTIONS 906

| | A | B | C | D | E | F | G | H | I | J | K | L |
|---|---|---|---|---|---|---|---|---|---|---|---|---|
| 1 | Annex | ELIN | Employee | Employee ID (unique identifier) | Governing WD | Labor Category | Actual Wage Paid | New Required Min Wage | Actual Fringe Paid | New Required Min Fringe | # of hours | OT scale |
| 2 | 1520 | 015AF | Merle Haggard | 644679 | CBA | GENERAL MAINTENANCE WORKER SD1 | $22.50 | $23.19 | $5.16 | $5.62 | 77.00 | 1.00 |
| 3 | 1520 | 015AG | Merle Haggard | 644679 | CBA | GENERAL MAINTENANCE WORKER SD2 | $22.56 | $23.25 | $5.16 | $5.62 | 35.00 | 1.00 |
| 4 | 1520 | 015AH | Merle Haggard | 644679 | CBA | GENERAL MAINTENANCE WORKER | $22.42 | $23.09 | $5.16 | $5.62 | 16.00 | 1.00 |
| 5 | 1520 | 015AF | Merle Haggard | 644679 | CBA | GENERAL MAINTENANCE WORKER | $22.42 | $23.09 | $5.16 | $5.62 | 11.50 | 1.00 |
| 6 | 1520 | 015AG | Merle Haggard | 644679 | CBA | GENERAL MAINTENANCE WORKER | $22.42 | $23.09 | $5.16 | $5.62 | 0.50 | 1.00 |
| 7 | 1520 | 015AH | Merle Haggard | 644679 | CBA | GENERAL MAINTENANCE WORKER | $22.42 | $23.09 | $5.16 | $5.62 | 9.00 | 1.50 |
| 8 | 0200 | 02EJB | Merle Haggard | 644679 | CBA | LABORER | $14.98 | $15.43 | $5.16 | $5.62 | 1.50 | 1.50 |
| 9 | 0200 | ANX 2 | Merle Haggard | 644679 | CBA | LABORER | $14.98 | $15.43 | $5.16 | $5.62 | 88.50 | 1.00 |
| 10 | 1410 | 014AA | Merle Haggard | 644679 | CBA | LABORER | $14.98 | $15.43 | $5.16 | $5.62 | 14.50 | 1.00 |
| 11 | 1410 | 014AB | Merle Haggard | 644679 | CBA | LABORER | $14.98 | $15.43 | $5.16 | $5.62 | 16.00 | 2.00 |
| 12 | 1410 | 014AC | Merle Haggard | 644679 | CBA | LABORER | $14.98 | $15.43 | $5.16 | $5.62 | 14.50 | 1.00 |
| 13 | 1320 | 015AC | Merle Haggard | 644679 | CBA | LABORER | $14.98 | $15.43 | $5.16 | $5.62 | 5.00 | 1.00 |
| 14 | 1410 | 014AH | Merle Haggard | 644679 | CBA | LABORER | $14.98 | $15.43 | $5.16 | $5.62 | 56.50 | 1.00 |
| 15 | 1520 | 015AF | Merle Haggard | 644679 | CBA | LABORER | $14.98 | $15.43 | $5.16 | $5.62 | 172.00 | 1.00 |
| 16 | 1520 | 015AG | Merle Haggard | 644679 | CBA | LABORER | $14.98 | $15.43 | $5.16 | $5.62 | 68.00 | 1.00 |
| 17 | 1520 | 015AH | Merle Haggard | 644679 | CBA | RAILROAD TRACK WORKER | $21.13 | $21.75 | $5.16 | $5.62 | 176.00 | 1.00 |
| 18 | 1520 | 015AI | Merle Haggard | 644679 | CBA | GENERAL MAINTENANCE WORKER | $22.42 | $23.09 | $5.16 | $5.62 | 7.00 | 1.00 |
| 19 | 1520 | 015AJ | Merle Haggard | 644679 | CBA | GENERAL MAINTENANCE WORKER | $22.42 | $23.09 | $5.16 | $5.62 | 14.50 | 1.00 |
| 20 | 0200 | 02EJB | George Jones | 649688 | CBA | | | | | | 2.00 | 1.00 |
| 21 | 0200 | ANX 2 | George Jones | 649688 | CBA | | | | | | 152.50 | 1.00 |
| 22 | 1410 | 014AB | George Jones | 649688 | CBA | | | | | | 2.00 | 1.50 |

FIG. 13A

| | A | B | C | D | E | F | G | H | I | J | K | L | M |
|---|---|---|---|---|---|---|---|---|---|---|---|---|---|
| 1 | CLIN | SUB-CLIN | Employee | Employee ID unique identifier | Governing WD | Labor Category | Actual Wage Paid | New Required Min Wage | Actual Fringe Paid | New Required Min. Fringe | # of hours | OT scale | |
| 2 | 0200 | ANX.2 | Aretha Franklin | 659794 | CBA | MAINTENANCE ELECTRICIAN | $25.18 | $25.94 | $5.16 | $5.62 | 75.10 | 1.00 | |
| 3 | 1420 | 014AH | Aretha Franklin | 659794 | CBA | MAINTENANCE ELECTRICIAN | $25.18 | $25.94 | $5.16 | $5.62 | 10.10 | 1.00 | |
| 4 | 1510 | 015AC | Aretha Franklin | 659794 | CBA | MAINTENANCE ELECTRICIAN | $25.18 | $25.94 | $5.16 | $5.62 | 22.00 | 1.00 | |
| 5 | 1520 | 015AF | Aretha Franklin | 659794 | CBA | MAINTENANCE ELECTRICIAN | $25.18 | $25.94 | $5.16 | $5.62 | 607.45 | 1.00 | |
| 6 | 1520 | 015AG | Aretha Franklin | 659794 | CBA | MAINTENANCE ELECTRICIAN | $25.18 | $25.94 | $5.16 | $5.62 | 465.60 | 1.00 | |
| 7 | 1520 | 015AH | Aretha Franklin | 659794 | CBA | MAINTENANCE ELECTRICIAN | $25.18 | $25.94 | $5.16 | $5.62 | 620.55 | 1.00 | |
| 8 | 1520 | 015AH | Aretha Franklin | 659794 | CBA | MAINTENANCE ELECTRICIAN | $25.18 | $25.94 | $5.16 | $5.62 | 8.00 | 1.50 | |
| 9 | 1620 | 016AB | Aretha Franklin | 659794 | CBA | MAINTENANCE ELECTRICIAN | $25.18 | $25.94 | $5.16 | $5.62 | 0.50 | 1.00 | |
| 10 | 1640 | 016AE | Aretha Franklin | 659794 | CBA | MAINTENANCE ELECTRICIAN | $25.18 | $25.94 | $5.16 | $5.62 | 6.10 | 1.50 | |
| 11 | 1650 | 016AG | Aretha Franklin | 659794 | CBA | MAINTENANCE ELECTRICIAN | $25.18 | $25.94 | $5.16 | $5.62 | 2.00 | 1.00 | |
| 12 | 1660 | 016AJ | Aretha Franklin | 659794 | CBA | MAINTENANCE ELECTRICIAN | $25.18 | $25.94 | $5.16 | $5.62 | 12.00 | 1.50 | |
| 13 | 1670 | 016AL | Aretha Franklin | 659794 | CBA | MAINTENANCE ELECTRICIAN | $25.18 | $25.94 | $5.16 | $5.62 | 1.50 | 1.50 | |
| 14 | 1700 | 017AC | Aretha Franklin | 659794 | CBA | MAINTENANCE ELECTRICIAN | $25.18 | $25.94 | $5.16 | $5.62 | 2.00 | 1.50 | |
| 15 | 1740 | 017AL | Aretha Franklin | 659794 | CBA | MAINTENANCE ELECTRICIAN | $25.18 | $25.94 | $5.16 | $5.62 | 1.00 | 1.50 | |
| 16 | 0200 | ANX.2 | Art Garfunkel | 649464 | CBA | MAINTENANCE MECHANIC | $23.44 | $24.14 | $5.16 | $5.62 | 0.10 | 1.00 | |
| 17 | 1410 | 014AA | Art Garfunkel | 649464 | CBA | MAINTENANCE MECHANIC | $23.44 | $24.14 | $5.16 | $5.62 | 83.50 | 1.00 | |
| 18 | 1420 | 014AH | Art Garfunkel | 649464 | CBA | MAINTENANCE MECHANIC | $23.44 | $24.14 | $5.16 | $5.62 | 0.25 | 1.00 | |
| 19 | 1420 | 014AH | Art Garfunkel | 649464 | CBA | MAINTENANCE MECHANIC | $23.44 | $24.14 | $5.16 | $5.62 | 1.00 | 1.00 | |
| 20 | 1510 | 015AC | Art Garfunkel | 649464 | CBA | MAINTENANCE MECHANIC | $23.44 | $24.14 | $5.16 | $5.62 | 2.00 | 1.00 | |
| 21 | 1520 | 015AF | Art Garfunkel | 649464 | CBA | MAINTENANCE MECHANIC | $23.44 | $24.14 | $5.16 | $5.62 | 341.25 | 1.00 | |
| 22 | 1520 | 015AG | Art Garfunkel | 649464 | CBA | MAINTENANCE MECHANIC | $23.44 | $24.14 | $5.16 | $5.62 | 43.25 | 1.00 | |
| 23 | 1520 | 015AH | Art Garfunkel | 649464 | CBA | MAINTENANCE MECHANIC | $23.44 | $24.14 | $5.16 | $5.62 | 1,350.50 | 1.00 | |
| 24 | 1520 | 015AH | Art Garfunkel | 649464 | CBA | MAINTENANCE MECHANIC | $23.44 | $24.14 | $5.16 | $5.62 | 108.00 | 1.50 | |
| 25 | 1620 | 015AG | Art Garfunkel | 649464 | CBA | MAINTENANCE MECHANIC | $23.44 | $24.14 | $5.16 | $5.62 | 7.00 | 1.00 | |
| 26 | 1620 | 015AH | Art Garfunkel | 649464 | CBA | MAINTENANCE MECHANIC | $23.44 | $24.14 | $5.16 | $5.62 | 303.50 | 1.00 | |
| 27 | 1620 | 015AH | Art Garfunkel | 649464 | CBA | MAINTENANCE MECHANIC | $23.44 | $24.14 | $5.16 | $5.62 | 11.00 | 1.00 | |
| 28 | 1670 | 016AK | Art Garfunkel | 649464 | CBA | MAINTENANCE MECHANIC | $23.44 | $24.14 | $5.16 | $5.62 | 22.25 | 1.00 | |
| 29 | 1740 | 017AK | Art Garfunkel | 649464 | CBA | MAINTENANCE MECHANIC | $23.44 | $24.14 | $5.16 | $5.62 | 1.00 | 1.00 | |
| 30 | 1536 | 015AJ | Billy Holiday | 749440 | CBA | DRIVER, HEAVY MOTOR VEHICLE(B) | $19.20 | $19.78 | $5.16 | $5.62 | 16.00 | 1.00 | |
| 31 | 1660 | 016AJ | Billy Holiday | 749440 | CBA | DRIVER, HEAVY MOTOR VEHICLE(B) | $19.20 | $19.78 | $5.16 | $5.62 | 8.00 | 1.00 | |
| 32 | 0200 | ANX.2 | Billy Holiday | 749440 | CBA | DRIVER, MEDIUM MOTOR VEHICLE | $18.73 | $19.29 | $5.16 | $5.62 | 55.50 | 1.00 | |
| 33 | 1410 | 014AB | Billy Holiday | 749440 | CBA | DRIVER, MEDIUM MOTOR VEHICLE | $18.73 | $19.29 | $5.16 | $5.62 | 6.00 | 1.00 | |
| 34 | 1410 | 014AB | Billy Holiday | 749440 | CBA | DRIVER, MEDIUM MOTOR VEHICLE | $18.73 | $19.29 | $5.16 | $5.62 | 3.00 | 1.00 | |
| 35 | 1510 | 015AC | Billy Holiday | 749440 | CBA | DRIVER, MEDIUM MOTOR VEHICLE | $18.73 | $19.29 | $5.16 | $5.62 | 23.50 | 1.00 | |
| 36 | 1510 | 015AC | Billy Holiday | 749440 | CBA | DRIVER, MEDIUM MOTOR VEHICLE | $18.73 | $19.29 | $5.16 | $5.62 | 2.00 | 1.00 | |
| 37 | 1520 | 015AG | Billy Holiday | 749440 | CBA | DRIVER, MEDIUM MOTOR VEHICLE | $18.73 | $19.29 | $5.16 | $5.62 | 64.50 | 1.00 | |
| 38 | 1520 | 015AH | Billy Holiday | 749440 | CBA | DRIVER, MEDIUM MOTOR VEHICLE | $18.73 | $19.29 | $5.16 | $5.62 | 30.00 | 1.00 | |
| 39 | 1520 | 015AH | Billy Holiday | 749440 | CBA | DRIVER, MEDIUM MOTOR VEHICLE | $18.73 | $19.29 | $5.16 | $5.62 | 103.50 | 1.00 | |
| 40 | 1520 | 015AF | Billy Holiday | 749440 | CBA | DRIVER, MEDIUM MOTOR VEHICLE | $18.73 | $19.29 | $5.16 | $5.62 | 6.50 | 1.00 | |
| 41 | 1520 | 015AH | Billy Holiday | 749440 | CBA | DRIVER, MEDIUM MOTOR VEHICLE | $18.73 | $19.29 | $5.16 | $5.62 | 2.00 | 1.00 | |
| 42 | 1536 | 015AJ | Billy Holiday | 749440 | CBA | DRIVER, MEDIUM MOTOR VEHICLE | $18.73 | $19.29 | $5.16 | $5.62 | 63.50 | 1.00 | |
| 43 | 1536 | 015AJ | Billy Holiday | 749440 | CBA | DRIVER, MEDIUM MOTOR VEHICLE | $18.73 | $19.29 | $5.16 | $5.62 | 15.50 | 1.00 | |
| 44 | 1630 | 016AC | Billy Holiday | 749440 | CBA | DR  R VEHICLE | $18.73 | $19.29 | $5.16 | $5.62 | 1.00 | 1.00 | |

FIG. 13B

| | | | |
|---|---|---|---|
| Payout to Contractor Savings | Total $Value of DOD SCA Actions/year (Actuals taken from FY07 FPDSNG data) | Total Impacted $ (Assume 60% of them adjust (this would be the $amount subject to the use of PACTp *VERY CONSERVATIVE)) | Assume 2% wage and fringe increase per year adjustment (this is the $ value actually changing due to use of the tool) | Assume 3% savings caused by PACTp per adjustment (this is how much the Gov would save in payments to the contractor in 1 year*VERY CONSERVATIVE one test has shown 50% savings!) |
| | $ 34,010,747,010.76 | $ 20,406,448,206.46 | $ 408,128,964.13 | $12,243,868.92 |

| | | | |
|---|---|---|---|
| Government Man-Hour Savings | Total DOD # of contract actions/year (Actuals taken from FY07 FPDSNG data) | Total # of Price Adjustments (Assume 60% of them adjust (this would be the # of actions subject to the use of PACTp VERY CONSERVATIVE) | Total Estimated Man Hours (Assume 50 Gov Man Hours per Price Adjustment*VERY CONSERVATIVE) | Total Estimated Cost of Gov Man Hours (Assume an average GS11 or 12 journeyman performs analysis (average between GS11-1 and 12-10 is $34.45/hour) (this is the amount of money it costs the government for each adjustment)) | Assume each adjustment now takes 5 minutes (New Cost to Gov for Price Adjustments using PACTp) |
| | $119,000.00 | $71,400.00 | $3,570,000.00 | $126,556,500.00 | $204,157.59 |

| | |
|---|---|
| Difference between old cost and new cost (this is the cost savings caused by PACTp) | Total estimated first year savings to Gov |
| $126,352,342.41 | $138,596,211.33 |

FIG. 14

METHODS AND SYSTEMS OF PURCHASE CONTRACT PRICE ADJUSTMENT CALCULATION TOOLS

FIELD OF THE INVENTION

The present invention relates to the Federal Acquisition Regulations (hereafter the "FAR"), the Department of Defense FAR Supplement (hereafter the "DFARS") and the Code of Federal Regulations (hereafter the "CFR") policy in regard to the Service Contract Act. More particularly, the present invention transforms FAR, DFARS and CFR policies related to the Service Contract Act into a useful method of automated mathematical calculations and performs analyses and determinations of economic factors regarding contract price adjustments for at least multi-year or multiple option year contracts.

BACKGROUND OF THE INVENTION

Generally, in response to the FAR, DFARS and CFR policies related to the Service Contract Act, contractors are required to submit price adjustment proposals, for calculations, analyses and determinations by Government Contract Specialists. Currently, the calculations, analyses and determinations are performed manually and/or performed with the limited aid of noncomprehensive spreadsheets (either automated spreadsheets or hardcopy paper spreadsheets or the calculations and analyses are sometimes not performed at all) by the Government Contract Specialists in view of the rules, regulations and policies governed by the FAR, DFARS and CFR, as they pertain to arriving at a correct subset of hours entitled to price adjustment, and/or arriving at the correct amount of a price adjustment and/or arriving at a correct allocation of a price adjustment to line items of any given federal service and/or construction contract.

The chapter for SCA in the FAR does not require contractors to submit wage adjustment proposals using a specific and/or prescribed format. Consequently and/or routinely, raw data provided by contractors are voluminous and complex. For any given contract proposal, contractor data may be structured as hundreds of contract line items, where each line item may have multiple parts. In addition, each line item may have multiple customers and each customer may fund different purchases using different colors of money. Each line item may utilize multiple (sometimes 10-20) labor categories, which can be an overwhelming compliance task for the Government Contract Specialist. Further, the labor categories at issue can be governed by multiple wage determinations, even within the same line item, there may be three or more wage determinations governing labor rates. In addition, the Government Contract Specialist must perform high level analyses involving summarizing and subtotaling the contractor's raw data on several different factors to draw out data integrity, validity, consistency, and allowability of a given proposal. The opposite occurrence, which is equally as pervasive, is that contractors sometimes submit summarized data which cannot be analyzed on more than one level or the summarized data cannot be easily checked for validity by the Government Contract Specialist. Additionally, there is no uniformly accepted format or process for a Government Contract Specialist to utilize in performing analyses on a contractor's wage adjustment proposal.

A complex contractor proposal for any given military base operating service contract (i.e., BOSC) can take three or more Government Contract Specialists working full time over three months to calculate price adjustments for such a complex contract. There may be multiple contractor submissions and resubmissions for the Government Contract Specialists to keep track of. Each contractor submission and/or resubmission proposal may include contents amounting to multiple spreadsheets and each spreadsheet may contain ten to fifteen worksheets containing over twenty columns of information, per worksheet. To add to the inconsistency and confusion, random complex embedded formulas may be embedded in calculated cells of any given spreadsheet and copied over thousands of rows of data. Furthermore, other individuals and advisors may be required to evaluate allowability and allocability of requests and perform formula analysis and compliance analysis.

The instant application incorporates by reference the FAR Clauses at 52.222-43/44, which contain material related to the development of an algorithmic expression and/or a plurality of algorithmic expressions and formulas used in the methods and systems of the SCA PACT tool; although related, this material does not comprise the essential ingredient(s) relied upon in the creative process of developing the SCA PACT tool. The FAR Clauses at 52.222-43/44, relating to the Fair Labor Standards Act and Service Contract Act-Price Adjustment, although similar to "equitable adjustments", are also significantly different in that they have their own criteria as to what is permissible for price adjustment and what is not. The FAR clauses specifically exclude profit, overhead and general and administrative expenses. The clauses also limit the adjustment to "actual increases" in costs that are caused explicitly by the contractor being "made to comply" with a SERVICE CONTRACT ACT contract (i.e., an SCA) wage determination that requires a higher wage and/or fringe benefit rate. The SERVICE CONTRACT ACT applies only to service employees, where the phrase service employees means any person engaged in the performance of a service contract or subcontract, other than persons employed in bona fide executive, administrative, or professional capacities. The instant application incorporates by reference the SERVICE CONTRACT ACT OF 1965, codified in FAR Clauses at FAR Subpart 22.10; DFARS Subpart 222.10, FAR 22.1003, and FAR 22.1003, which contain material related to the development of algorithmic expressions and formulas used in the methods and systems of the SCA PACT tool (see, MCNAMARA-O'HARA SERVICE CONTRACT ACT OF 1965 (SCA, see 41 U.S.C. §§351-358; 29 C.F.R. Part 4; FAR Subpart 22.10; DFARS Subpart 222.10; FAR 22.1002; and FAR 22.1003); although related, this material does not comprise the essential ingredient(s) relied upon in the creative process of developing the SCA PACT tool. Contractors performing any service contracts shall pay their employees not less than the Fair labor Standards Act minimum wage. The instant application incorporates by reference the FAIR LABOR STANDARDS ACT OF 1938 (FLSA), codified in FAR Clauses at FAR Subpart 22.10, which contain material related to the development of algorithmic expressions and formulas used in the methods and systems of the SCA PACT tool (see, the FAIR LABOR STANDARDS ACT OF 1938 (FLSA) 29 U.S.C. §§201-219; and FAR Subpart 22.10); although related, this material does not comprise the essential ingredient(s) relied upon in the creative process of developing the SCA PACT tool. Also, see the DAVIS BACON ACT; which applies to federal contracts involving construction of public buildings or public works. The instant application incorporates by reference the DAVIS BACON Act, codified in FAR and DFARS Clauses at FAR Subpart 22.4 and DFARS Subpart 222.4, which contain material related to the development of algorithmic expressions and formulas used in the methods and systems of the SCA PACT tool (see, DAVIS BACON ACT, 40 U.S.C. §§3141-3144; 29 C.F.R. Part 5; FAR Subpart 22.4 and DFARS Subpart 222.4); although related, this material does not comprise the essential ingredient(s) relied upon in the creative process of developing the SCA PACT tool.

The instant application also incorporates by reference a Department of the Navy document titled DESK GUIDE FOR SERVICE CONTRACT PRICE ADJUSTMENTS SERVICE CONTRACT ACT AND FAIR LABOR STANDARDS ACT, JANUARY 2007, which contains material related to the development of algorithmic expressions and formulas used in the methods and systems of the SCA PACT tool; although related, this material does not comprise the essential ingredient(s) relied upon in the creative process of developing the SCA PACT tool.

Historically, contract price adjustments have created substantial challenges for the Government acquisition community for two reasons. First, contractors often include items in their price adjustment proposals that the applicable FAR, DFARS and CFR clauses do not permit and therefore if "rubber stamped" by the individual Government Contract Specialist evaluating the price adjustment proposal, these impermissible items lead to Government wide inconsistencies in price adjustment calculations and determinations, which in turn lead to any given Government agency paying adjustments that are greater than the contractors correct entitlement under the clause(s). Second, the contractor's proposals are often very detailed and complex. Therefore, when given the scrutiny necessary to arrive at a correct contract price adjustment, the process can be extremely time consuming for the Government Contract Specialist to review and analyze. Currently, there is little if any time dedicated to such close scrutiny and checks because of the inordinate amount of time it takes to calculate numerous contract price adjustments.

Federal agencies spend over thirty-four (34) billion dollars in service contracts, where at least, sixty percent of the service contracts are adjusted using the aforementioned price adjustment clauses. Thus, wage rates may go up concomitantly approximately two to four percent per year. Therefore, it is conservatively estimated that the SCA PACTp tool saves three percent on every service contract that is adjusted. Thus, hundreds of millions of dollars can be saved per year by implementing the SCA PACTp tool, based on two factors (1) enforcing legal requirements in regard to paying contractors for price adjustments and (2) providing savings in person hours worked for users, operators and contract specialists in regard to calculations and analyses. On average, at fifty hours of price adjustments per 100,000 contract actions multiplied by the average journeyman pay rate of a contract specialist, the Government could realize savings in dollars spent on adjustments, and realize savings in dollars and hours for finance people and contracts people and could realize productivity savings. There is a third level of savings that contractors can realize, based on having a standard format required for submission of contract price adjustment proposal data. Contractors do not have to go through numerous iterations of determining just what data the user, operator and/or contract specialist wants and how and in what format the user, operator and/or contract specialist wants that data. An additional incentive is recognized by a plurality of contract workers who receive appropriate pay and benefits, when price adjustments are correctly determined and administered.

SCA and DBA contract price adjustments have never been organized and determined in an automated manner before, and in such a manner that clearly informs the purchasing end user and/or customer using the contract, just what and how much a given increase is for, i.e., where the working efforts are allocated. Thus, the importance of the SCA PACT tool is that the format that the raw data is received in is allocable. Allocability of contract pricing is a FAR requirement that had been virtually unattainable in contract price adjustments for large contracts, until the development of the SCA PACT tool.

Therefore, the need exists for a computer automated method and system, using software program applications, to standardize and make more efficient the processes for adjustment of contract prices due to the impact of the SCA.

Further, the need exists for an automation tool that provides intuitive, user friendly interfaces which can be globally updateable, in regard to keeping pace with changes in applicable FAR, DFARS and CFR clauses.

The need exists for an automation tool providing an automated method and instructions which will save person hours per contract in wage adjustment analyst time by decreasing the time and focus of Government Contract Specialists required for performing tedious and time consuming contract price adjustment tasks, requiring overtime, associated with determining, interpreting and implementing complex procedures or trade-offs in making wage and health and welfare calculations of labor and cost adjustments under the Service Contract Act rules.

The need exists for an automation tool that will reduce the requirement for multiple Government Contract Specialists and multiple compliance analysts to be involved with any given complex contract price adjustment determination.

The need exists for an automated method that will provide means for saving costs by eliminating unallowable adjustments.

The need exists for an automation tool that will shift the person hour focus of Government Contract Specialists from analysis of line items and compliance with the SERVICE CONTRACT ACT and DAVIS BACON ACT regulations to the important focus of determining accuracy and validity of any request for contract price adjustment, while maintaining focus on allowability and proper allocability for contract price adjustments.

The need exists for an automation tool that will simplify SERVICE CONTRACT ACT and DAVIS BACON ACT wage adjustments, while providing accuracy and consistency in Federal contract price adjustment determinations.

SUMMARY OF THE INVENTION

A method and system including instructions implemented in a computer readable and executable program on a computer processor is described herein and is in the form of a SERVICE CONTRACT ACT PRICE ADJUSTMENT CALCULATION TOOL prototype for automatically calculating, analyzing, screening for compliance, allowability, allocability and adjusting contract prices due to the impact of SERVICE CONTRACT ACT requirements.

The method comprising receiving a request from a contractor for a contract price adjustment and providing to the contractor a submission format for a proposed contract price adjustment.

The proposed contract price adjustment is received in an electronic spreadsheet format from the contractor. After opening the electronic spreadsheet, a plurality of data from the price adjustment proposal is copied and pasted electronically into a corresponding proper electronic spreadsheet reception format for use by a Government Contract Specialist.

The method calculates payroll taxes and total adjustment entitlements using SERVICE CONTRACT ACT odd or even wage determination regulations implemented in algorithms containing mathematical expressions of contract price adjustment regulations.

When a given contract price adjustment proposal contains DAVIS BACON ACT hours, then a filtered version of the DAVIS BACON ACT information (including DAVIS BACON Act hourly pay rates) is created and represented by a tab for raw data wage health and welfare rate information and the computer processor performs a designating operation by designating a calculate totals button in a graphical user interface for one or more of either SCA data wage information and/or DAVIS BACON ACT information.

Subsequently, records from the filtered version of the DAVIS BACON ACT information are copied and pasted in and/or on the tab representing raw data wage health and welfare rate information.

When the contract price adjustment proposal does contain DAVIS BACON ACT hours, the method continues to a calculation operation, wherein, upon receipt of a signal from an input device actuated by the Government Contract Specialist user and/or operator, selecting, in the graphical user interface on the computer, the calculate totals button for the tab representing raw data wage health and welfare rate information is actuated and the tab representing DAVIS BACON ACT breakout information is actuated, causing a series of calculations to be made for payroll taxes and appropriate adjustment entitlement values.

The calculate totals button, in a menu or template of the graphical user interface associated with the method of performing contract price adjustments, is designated (for example highlighted) for a tab representing raw data wage and health and welfare rate information. This information resides in a data repository for storing raw data wage and health and welfare rate information.

Another calculate totals operation is designated for a tab representing DAVIS BACON ACT breakout information in a data repository for storing DAVIS BACON ACT breakout information.

The method analyzes, automatically in an analyzing operation, using DAVIS BACON ACT regulations, the series of calculations for payroll taxes and the method implemented by the computer processing system further determines in a determining operation appropriate price adjustment entitlement data. The computer processing system includes a computer readable and computer executable program that uses updated and updateable applicable SERVICE CONTRACT ACT and DAVIS BACON ACT policies codified in the Federal Acquisition Regulations and Code of Federal Regulations for determining the appropriate price adjustment entitlement data.

The method, as implemented by the system, populates (i.e., fills down) fields in the computer readable and computer executable program for payroll taxes and appropriate adjustment entitlements data. Furthermore, the method is programmed to use applicable SERVICE CONTRACT ACT and DAVIS BACON ACT policy requirements, according to the Federal Acquisition Regulations, to determine how data fields are populated for data summarization and visualization in a plurality of pivot tables.

Whether the contractors contract price adjustment proposal contains or does not contain DAVIS BACON ACT hours, the method continues to a tab opening and refreshing operation, where each tab of a plurality of tabs is opened by the user, operator, and/or contract specialist then the user, operator, and/or contract specialist actuates an icon that causes data in the plurality of pivot tables to be refreshed. Thus, the Government Contract Specialist user/operator selects an icon to effect data summarization and visualization, in the plurality of pivot tables.

Furthermore, the method, as implemented in the system automatically transforms and organizes contractor data required for contract price adjustments (i.e., the method facilitates manual targeting by the Government Contract Specialist user/operator) of specific records required for verification from the contractor seeking contract price adjustment.

The method, as implemented in the system automatically provides helpful tips and/or hints in designated, highlighted, activated or colorized areas, i.e., blue boxes positioned on each worksheet/spreadsheet of a plurality of worksheets/spreadsheets displayed on the system and used by the Government Contract Specialist user and/or operator to understand and determine allowability and compliance verification of the request and/or proposal made by the contractor seeking contract price adjustment.

BRIEF DESCRIPTION OF THE DRAWINGS

FIG. 5 represents a screen shot of a tab of a spreadsheet containing a line item pivot summary in the spreadsheet.

FIG. 6 represents a screen shot of an employee pivot summary in a spreadsheet.

FIG. 7 represents a screen shot of a wage determination pivot summary in a spreadsheet.

FIG. 8 represents a screen shot of a most worked labor categories rate pivot summary in a spreadsheet.

FIG. 9A illustrates a screen shot of a DAVIS BACON breakout raw data worksheet.

FIG. 9B illustrates a screen shot of a Raw Data-Wage H&W worksheet.

FIG. 10 represents a screen shot of a DAVIS BACON pivot hours & dollars per employee pivot summary.

FIG. 11 represents a screen shot of a DAVIS BACON ACT adjustment and line item pivot summary.

FIG. 12 illustrates Total Adjustment Entitlement formulas.

FIG. 13A illustrates a screen shot of exemplary worksheet instructions for and a sample worksheet template for completing the contractor submission format spreadsheet template as illustrated in FIG. 13B.

FIG. 13B illustrates the completed contractor submission format spreadsheet template.

FIG. 14 illustrates Government dollar savings estimates realized by the SCA PACTp tool.

DETAILED DESCRIPTION OF THE INVENTION

Figure 1A:
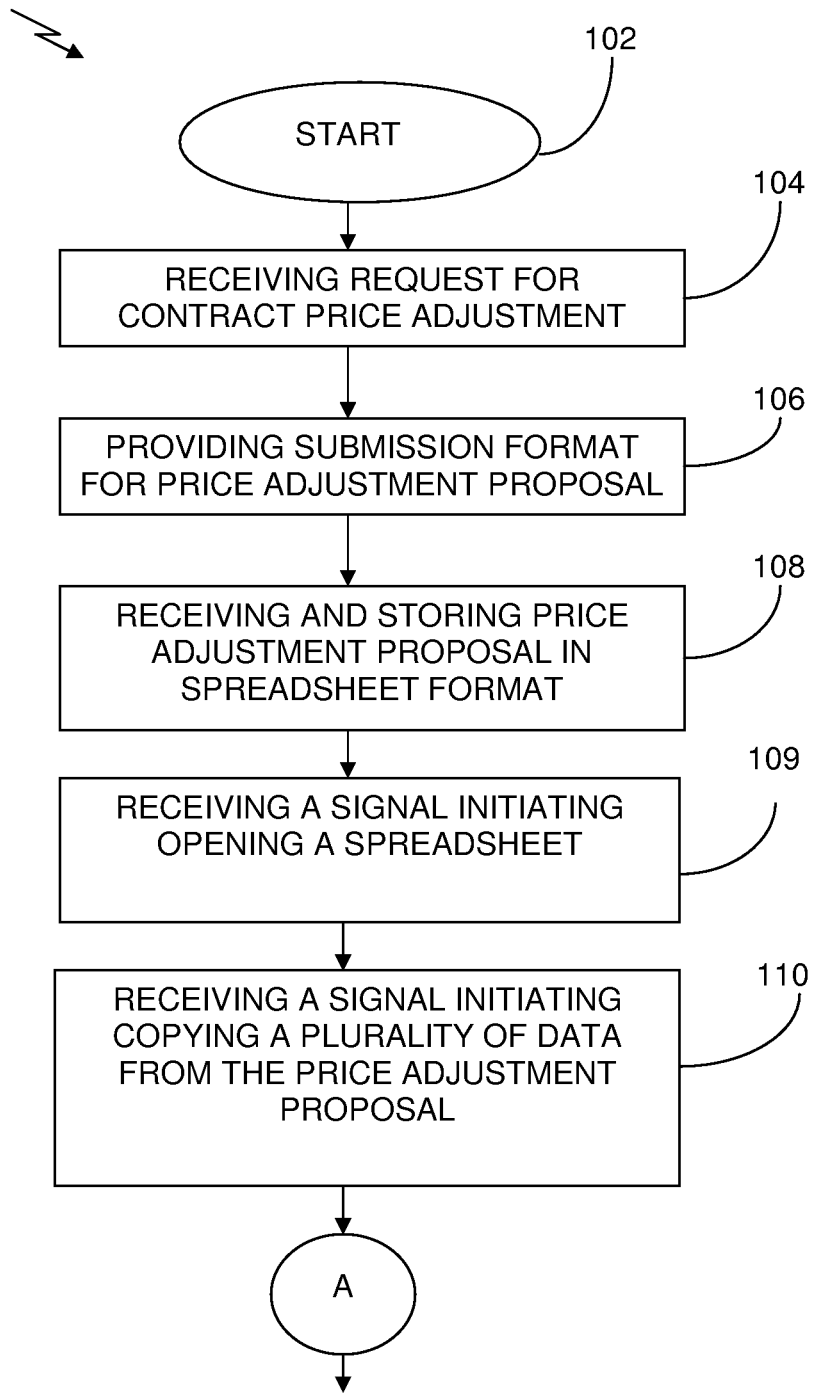
FIG. 1A illustrates elements of a method of calculating, analyzing, determining compliance with FAR and CFR requirements, determining allowability, allocability and adjusting contract prices due to the impact of SERVICE CONTRACT ACT wage adjustment rules and regulations for exercising options on multi year contracts and on anniversaries of multi year contracts.

Preferred exemplary embodiments of the present invention are now described with reference to the figures, in which like reference numerals are generally used to indicate identical or functionally similar elements. While specific details of the preferred exemplary embodiments are discussed, it should be understood that this is done for illustrative purposes only. A person skilled in the relevant art will recognize that other configurations and arrangements can be used without departing from the spirit and scope of the preferred exemplary embodiments. It will also be apparent to a person skilled in the relevant art that this invention can also be employed in other applications. Further, the terms "a", "an", "first", "second" and "third" etc. used herein do not denote limitations of quantity, but rather denote the presence of one or more of the referenced items(s).

Referring to FIG. 1A, FIG. 1B, FIG. 1C and FIG. 2, in accordance with a first exemplary embodiment, a method 100 is implemented in a computer readable and executable program executed on a computer system 200 (hereafter the "system 200"). The method 100 is implemented as a SERVICE CONTRACT ACT (SCA) PRICE ADJUSTMENT CALCULATION TOOL prototype (SCA PACTp). The method 100 automatically determines contract price adjustments by calculating, organizing and screening for allowability and allocability of contract price adjustments, based on requirements of the SCA wage determination rules, regulations and updates for option and extension periods of service contracts. SCA requires that contractors performing any federal service contract shall pay their employees not less than rates prescribed by the FAIR LABOR STANDARDS ACT OF 1938 (i.e., FLSA).

Figure 2:
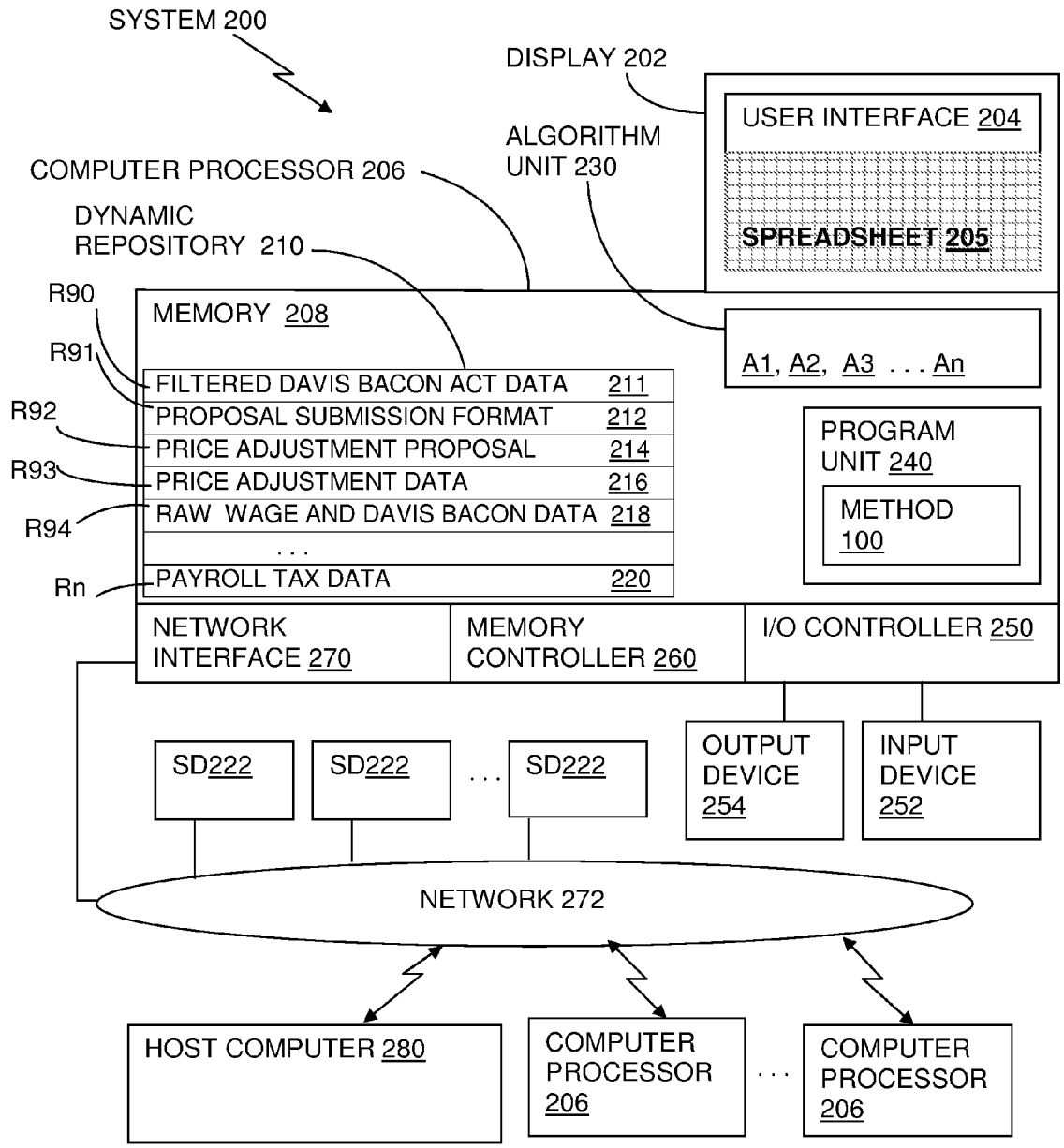
FIG. 2 illustrates a system implementing the method illustrated in FIG. 1A, FIG. 1B, FIG. 1C, FIG. 1D and FIG. 1E.

Referring to FIG. 2, in accordance with exemplary embodiments, the system 200 embodies and implements the various methods, procedures, instructions and operations of the method 100 in the structure of computer executable program code, computer executable and computer readable media and other hardware, firmware and/or software modules, network applications and interface platforms, upon which the method 100 is carried out within the technological arts.

Referring again to FIG. 2, in accordance with exemplary embodiments, the system 200 includes a computer processor 206 (hereafter "the computer processor 206") communicatively coupled to and/or communicatively coupling either externally or residing inside of the computer processor 206 a plurality of network interface controllers, input/output controllers, input devices and output devices, such as a network interface 270, a memory controller 260, an input/output controller 250 (hereafter "the I/O controller 250"), an input device 252, an output device 254, and a display 202, where the display 202 displays a user interface 204 and a spreadsheet 205. In exemplary embodiments, the spreadsheet 205 represents any spreadsheet software application package including EXCEL or LOTUS or any other commercially available spreadsheet software application package and can be accessed and exercised interactively by a user using the computer processor 206, either locally or over the network 272.

Referring to FIG. 2, in accordance with exemplary embodiments, the network interface 270 communicatively connects the computer processor 206 to a network 272, where a plurality of client side, server side and/or user networked devices reside, interact and operate communicatively over the network 272. The network 272 can be a wide area communications network, including an Internet or an extranet or the network 272 can be a local area network, including an intranet. These networked devices and systems can include host computers, such as a host computer 280; these devices and systems can include storage devices, such as tape drives, disc drives operating individually or in storage library farms, for example a plurality of storage devices can include a device such as one or more of an SD222. These networked devices can also include a plurality of devices, such as the computer processor 206.

Referring to FIG. 2, in accordance with exemplary embodiments, the input device 252 can be at least one or more of a mouse, a keyboard, a touch screen terminal, a light pen wand, a joystick, a thumbwheel, a copier system or machine, a hardcopy paper scanner system or machine, a microphone or an electronic and/or a radio frequency scanning device (including RFID).

In exemplary embodiments, the system 200 and the method 100 illustrated in FIG. 2 and FIG. 1, respectively, can be implemented in software, firmware and/or hardware or any combination of each. According to exemplary embodiments, the method 100 is implemented in software, as executable program code, which comprises an ordered listing of a plurality of computer executable instructions for implementing logical functions, and the method 100 is executed by either special or general purpose digital computers including a PDA, a personal computer, a workstation, a minicomputer or a mainframe computer.

In exemplary embodiments, the system 200 is implemented with a general purpose digital computer designated as the computer processor 206. The computer processor 206 is a hardware device for executing software implementing the method 100, as well as the method 300. The computer processor 206 can be any custom made or commercially available, off-the-shelf processor, a central processing unit (CPU), one or more auxiliary processors, a semiconductor based microprocessor, in the form of a microchip or chip set, a macroprocesssor or generally any device for executing software instructions. The system 200 when implemented in hardware can include discrete logic circuits having logic gates for implementing logic functions upon data signals, or the system 200 can include an application specific integrated circuit (ASIC).

Referring to FIG. 2, in accordance with exemplary embodiments, the computer processor 206 further includes a memory 208 (hereafter "the memory 208"). Residing in the memory 208 are a program unit 240 (hereafter "the program unit 240") and a dynamic repository 210 (hereafter "the dynamic repository 210"). Residing in the dynamic repository 210 are a plurality of repository entry locations R90, R91, R92, R93, R94, up to and including Rn, where Rn theoretically represents an infinite number of repository entry locations limited only by known physical and/or virtual memory capacity. Thus, each repository entry location R90 up to Rn can hold, store and/or save a plurality of information and/or data including data such as filtered DAVIS BACON ACT DATA 211, represented as being stored in repository entry location R90; a proposal submission format 212, represented as being stored in repository entry location R91; a price adjustment proposal 214, stored/saved in repository entry location R92; price adjustment data 216, held in repository entry location R93, raw wage and DAVIS BACON DATA 218, stored in repository entry location R94; and payroll tax data 220, saved in representative repository entry location Rn. DAVIS BACON ACT data and/or hours are prevailing wage rates on federal construction projects paid to mechanics and laborers performing construction work in the United States, where the construction projects exceed a dollar value of $2,000.00. Wages under the terms of the DAVIS BACON ACT include basic hourly pay rates plus fringe benefits. These groups of data and information can be easily and programmatically accessed and exercised by computer processor 206 to provide various solutions to price adjustment related problems, including mathematical calculations, analyses and determinations of economic factors regarding contract price adjustment for at least multi year or multiple option year contracts. In addition, a plurality of other data and information may be entered into the repository entry locations R90 through Rn, including for example, rules and regulations and U.S. Code governing SCA and DAVIS BACON ACT (DBA) requirements. Furthermore, these groups of information and data, including the plurality of other data can be stored temporarily and/or permanently and/or semi permanently in the repository entry locations R90 through Rn or stored over the network 272 in any of the plurality of storage devices residing on and/or communicatively coupled to the network 272, including the SD222. In exemplary embodiments, these groups of information and data can be downloaded programmatically over the network 272 or entered manually by way of the input device 252.

Referring again to FIG. 2, in accordance with exemplary embodiments, the memory 208 further includes an algorithm unit 230. Residing in the algorithm unit 230, is a plurality of algorithms such as an algorithm A1, an algorithm A2, an algorithm A3 up to and including an algorithm An, where the algorithm An theoretically represents an infinite number of algorithms limited only by known physical and/or virtual memory capacity. These algorithms can be in the form of one or more formulas, applets, programs, routines, sub routines, macro programs and/or micro programs and/or any combination of such programs, applets and formulas. In exemplary embodiments, these algorithms and/or formulas are represented as either individual segments which are executed to arrive at a total adjustment or these formulas are combined into a total adjustment formula applied to all cells containing data supplied by the contractor, enabling single touch calculations of multiple formulas using the calculate totals button 902. These algorithms and/or formulas are called by programmatic operations of the method 100 and the method 300, either automatically or manually to perform certain routine computational tasks or provide required data and determinations in the form or transforming contractor raw data into allowable, allocable and compliant total contract price adjustment data. Furthermore, these algorithms can be stored temporarily and/or permanently and/or semi permanently in the algorithm unit 230 or stored over the network 272 in any of the plurality of computers or storage devices, such as the SD222 or in a repository (such as the dynamic repository 210) in the computer processor 206 or in the host computer 280 or in any one or more of the computer processor 206. In exemplary embodiments, the plurality of algorithms and/or formulas can be downloaded programmatically over the network 272 or entered manually by way of the input device 252.

Figure 15A:
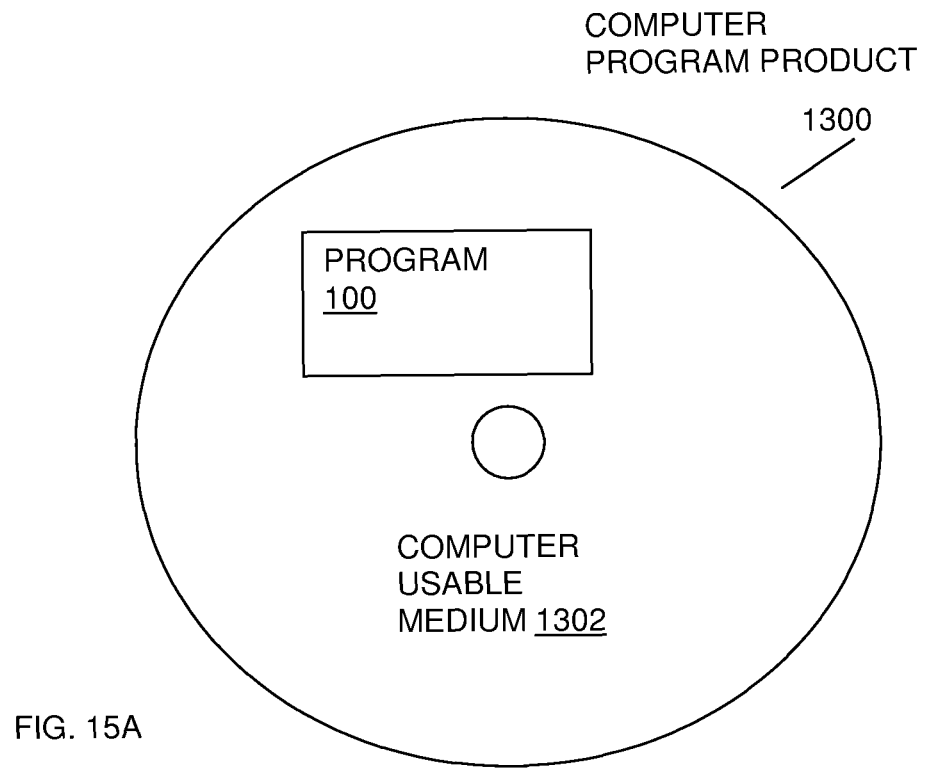
FIG. 15A illustrates an exemplary computer readable and computer executable medium containing a program product including program logic of a method 100 executed on a system 200 implementing purchase contract price adjustment calculation tools.
Figure 15B:
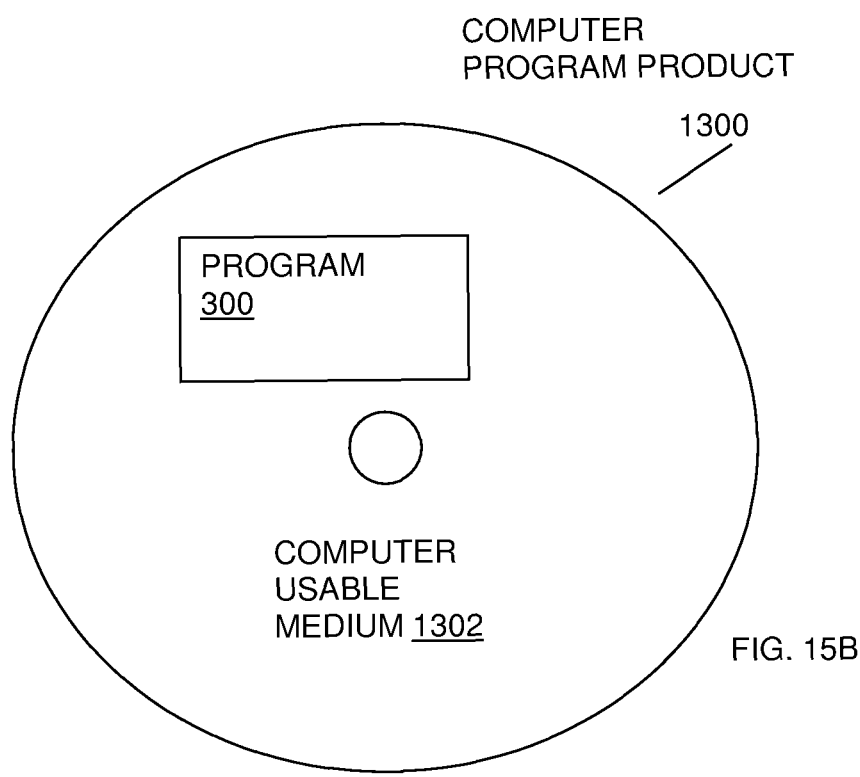
FIG. 15B illustrates an exemplary computer readable and computer executable medium containing a program product including program logic of a method 300 executed on the system 200 implementing purchase contract price adjustment calculation tools.

Referring to FIG. 2, FIG. 15A and FIG. 15B, in accordance with exemplary embodiments, residing in the program unit 240 is a plurality of computer readable and computer executable media (such as a computer usable medium 1302) which contain a plurality of computer programs, or algorithms and/or software applications, composing operations, instructions and/or procedures of the method 100 and/or the method 300 encoded as computer readable and computer executable program code, contained in a computer program product 1300. In exemplary embodiments, software in the program unit 240 includes a suitable operating system.

In exemplary embodiments, referring to FIG. 2, the memory 208 and the dynamic repository 210 and the plurality of storage devices including such devices as the SD222 can include any one of or a combination of volatile memory elements, including random access memory (i.e., including RAM, DRAM, SRAM and/or SDRAM) and non-volatile memory elements including read only memory (i.e., ROM, erasable programmable read only memory, electronically erasable programmable read only memory EEPROM, programmable read only memory PROM, and/or compact disc read only memory CDROM or FLASH memory or cache) magnetic tape, disk, diskette, cartridge, cassette and/or optical memory. The memory 208 can have an architecture where various components are situated remotely from one another, but can be accessed by the computer processor 206, either directly and/or locally or logically through various communications buses or remotely over the network 272.

Referring to FIG. 1A and FIG. 2, in accordance with a first exemplary embodiment, at an operation start 102 (hereafter "the operation 102"), the system 200 receives a signal from an operator or an individual user via either the input device 252 or an automatic programmatic wake up signal from the computer processor 206, which activates and initiates the computer executable program code implementing the method 100. The method 100, upon activation, performs other operations from selection signals received in the computer processor 206 from the input device 252, causing the method 100 to be executed by the computer processor 206 and in turn causing the computer processor 206 to perform operations and procedures including calling algorithms and software applications and executing the instructions in the algorithms and applications to perform operations and sub operations of the method 100 and/or the method 300 of providing various solutions to contract price adjustment related problems, including mathematical calculations, analyses and determinations of economic factors regarding contract price adjustments for at least multi year or multiple option year contracts.

Referring again to FIG. 1A, FIG. 1B, FIG. 1C and FIG. 2, in accordance with the first exemplary embodiment, at an operation receiving request for contract price adjustment 104 (hereafter "the operation 104"), the program code of the method 100 executed by the computer processor 206 of the system 200 causes the computer processor 206 to receive an initiation request, such as a request made by a contractor requesting a contract price adjustment. The request may be in the form of a signal from the contractor sent from the contractor's computer system, transmitted over the network 272 and received by the computer processor 206 or the request may be input through the input device 252 by a user of the computer processor 206, after the user receives the contractor's request for price adjustment via some other media including voice or hardcopy paper.

Referring to FIG. 1A, FIG. 2, FIG. 9A, FIG. 9B, FIG. 13A and FIG. 13B, in accordance with the first exemplary embodiment, at an operation providing submission format for price adjustment proposal 106 (hereafter "the operation 106"), in response to the contractor's request for price adjustment, the program code of the method 100 executed by the computer processor 206, causes the computer processor 206 to automatically transmit to the contractor and/or the contractor's computer system over the network 272 a submission format (see FIG. 13A and FIG. 13B for illustrations of a completed submission format spreadsheet template) for a contract price adjustment proposal that the contractor must adhere to in submitting the contractor's contract price adjustment proposal. The submission format includes blank electronic spreadsheet templates which accommodate odd number wage determination or even numbered wage determination or collective bargaining agreement proposal submission formats. The blank electronic spreadsheet templates can be in EXCEL spreadsheet format or any other commercial off the shelf spreadsheet software program application or noncommercial custom made and/or special spreadsheet software program application. The electronic spreadsheet format contains column and/or row headings which indicate types of data to be entered in various spreadsheet cells. Further, the submission format spreadsheet template includes instructions (see FIG. 13A, FIG. 9A and FIG. 9B, for exemplary worksheet instructions), in a word processing format, such as MSWORD. These instructions provide a roadmap for the contractor and/or the contractor's representative to follow, in regard to what data/information the contractor is required to provide and also in regard to how the contractor and/or the contractor's representative is to fill out and enter the required information for the price adjustment proposal from the contractor. Requiring a submission format of contractors has not been done before. See the raw example contractor data (i.e., KTR data) sent along with instructions (such as worksheet instructions 906) detailing how the contractor is to populate information in the required format (see FIG. 9B, FIG. 13A, FIG. 14 and FIG. 15). The submission format and the instructions can be transmitted to the contractor electronically or a hard copy paper version of the submission format can be delivered to the contractor. With this submission from the contractor, in the required submission format, the user, operator and/or contract specialist can utilize numerical algebraic formulas derived from complex nuances of the law to programmatically and comprehensively determine appropriate contract price adjustments.

Referring to FIG. 1A, and FIG. 2, in accordance with the first exemplary embodiment, at an operation receiving and storing price adjustment proposal in spreadsheet format 108 (hereafter "the operation 108"), the program code of the method 100 executed by the computer processor 206, causes the computer processor 206 to receive a price adjustment proposal transmitted by the contractor in an electronic spreadsheet format, which is subsequently stored and/or pasted on a computer executable and computer readable medium; thus pasted into the PACTp spreadsheet tool or stored in a database. The spreadsheet format includes, but is not limited to, EXCEL or can include any other commercially available spreadsheet application package, such as LOTUS or LOTUS 123 or WORDPERFECT QUATTRO PRO or CALC. Transmitting the price adjustment proposal transmitted by the contractor in the spreadsheet format can be accomplished by transmissions electronically from the contractor's computer system, scanner, and/or a facsimile machine, transmitted over the network 272, where the price adjustment proposal is received by the computer processor 206. In the exemplary embodiments, the price adjustment proposal transmitted by the contractor can be submitted in an electronic spreadsheet format, such as the spreadsheet 205, or may be input through the input device 252 by a user of the computer processor 206 or the contractor's price adjustment proposal can be transmitted by the contractor via some other media including voice or hardcopy paper.

Referring to FIG. 1A, and FIG. 2, in accordance with the first exemplary embodiment, at an operation receiving a signal initiating opening a spreadsheet 109 (hereafter "the operation 109"), the program code of the method 100 executed by the computer processor 206, causes the computer processor 206 to automatically open one or more sheets submitted by the contractor in the spreadsheet 205 of the price adjustment tool. These spreadsheets, such as represented by spreadsheet 205, submitted by the contractor, comply with the format of the blank spreadsheet format provided to the contractor in the operation 106 and can be received by a facsimile machine or hard copy scanner, as represented by the input device 252.

Referring to FIG. 1A, and FIG. 2, in accordance with the first exemplary embodiment, at an operation receiving a signal initiating copying a plurality of data from the price adjustment proposal 110 (hereafter "the operation 110"), the program code of the method 100 executed by the computer processor 206, causes the computer processor 206 to copy, to a temporary storage repository, such as the dynamic repository 210 or a clipboard, a plurality of data from the price adjustment proposal transmitted by the contractor, such as the price adjustment data 216 held in the repository entry location R93. In exemplary embodiments, after receiving a prompt from the computer processor 206 on the display 202, the user and/or operator or the contract specialist can manually designate and/or select, where designating and/or selecting can include highlighting, and then copy, using the input device 252 in conjunction with the user interface 204, the plurality of data from the price adjustment proposal, such as the price adjustment data 216, transmitted by the contractor into a temporary repository, such as the repository entry location R93 of the dynamic repository 210 or the clipboard. The computer processor 206 receives a signal from the user, operator, and/or contract specialist, directing the computer processor 206 to open each tab in the spread sheet 205 containing a blank pivot table and refreshes the data by actuating the input device 252, sending a signal indicating that an icon on a toolbar (from a plurality of toolbars containing a plurality of icons), such as a red exclamation point. Clicking on this exclamation point icon causes the program code of the method 100 to be further executed by the system 200 and causes the system 200 provide data summarization and visualization of the contractor data in the plurality of pivot tables.

The user, operator and/or contracting specialist, working with raw contractor submission data (i.e., Raw Example KTR submission data), highlights the Raw Example KTR submission data, which can be accessed by designating a tab in the spreadsheet 205. In the exemplary embodiments, the tab in the spreadsheet 205 can be labeled, KTR XYZ wage and HW submission, where HW is health and welfare data. Thus, the whole group of data (i.e., data in each row and column) under the KTR XYZ wage and HW tab is highlighted and copied. The operations of the method 100 are continued, as indicated by the continuation oval labeled as the letter A at the bottom of FIG. 1A and at the top of FIG. 1B.

Referring to FIG. 1A, FIG. 1B, FIG. 2 and FIG. 9B, in accordance with the first exemplary embodiment, at an operation receiving a signal initiating pasting the plurality of data from the price adjustment proposal into reception format 112 (hereafter "the operation 112"), the program code of the method 100 executed by the computer processor 206, causes the computer processor 206 to automatically paste, to an other sheet of the spreadsheet 205 in the temporary storage repository, such as the dynamic repository 210 or a clipboard, the group of data from the price adjustment proposal transmitted by the contractor, such as the price adjustment data 216, which was copied in the operation 110. In exemplary embodiments, the other sheet of the spreadsheet 205 can be either a test run price adjustment tool sheet which is totally blank for demonstration purposes or a regular (i.e., non-test run price adjustment tool sheet) and the sheet of the spreadsheet 205 can be opened to a corresponding blank sheet under the tab RAW Data Wage and HW (i.e., health and welfare) (hereafter the "Raw Data Wage and H&W worksheet tab 904") of the Raw Data Wage and H&W Worksheet 903 (see FIG. 9B). In exemplary embodiments, the group of data is pasted in the price adjustment tool sheet, so as to populate a plurality of columns in the spreadsheet 205. The titles of the columns include: Annex, ELIN, Employee, Employee ID (unique identifier), Governing WD, Labor Category, Old Wage Required, Actual Wage Paid, New Required Min Wage, Old Fringe Required, Actual Fringe Paid, New Required Min Fringe, # of hours, and OT SCALE, etc. In exemplary embodiments, the user and/or operator or the contract specialist can manually paste into a corresponding proper reception format (where the proper reception format includes odd numbered wage determinations or even numbered wage determinations or collective bargaining agreement determinations) the group of data from the price adjustment proposal, such as the price adjustment data 216, submitted by the contractor. The plurality of data includes the data copied into the temporary storage repository, such as the price adjustment data 216. The pasting can be accomplished by the user or operator or contract specialist using the input device 252 in conjunction with the user interface 204.

Figure 1B:
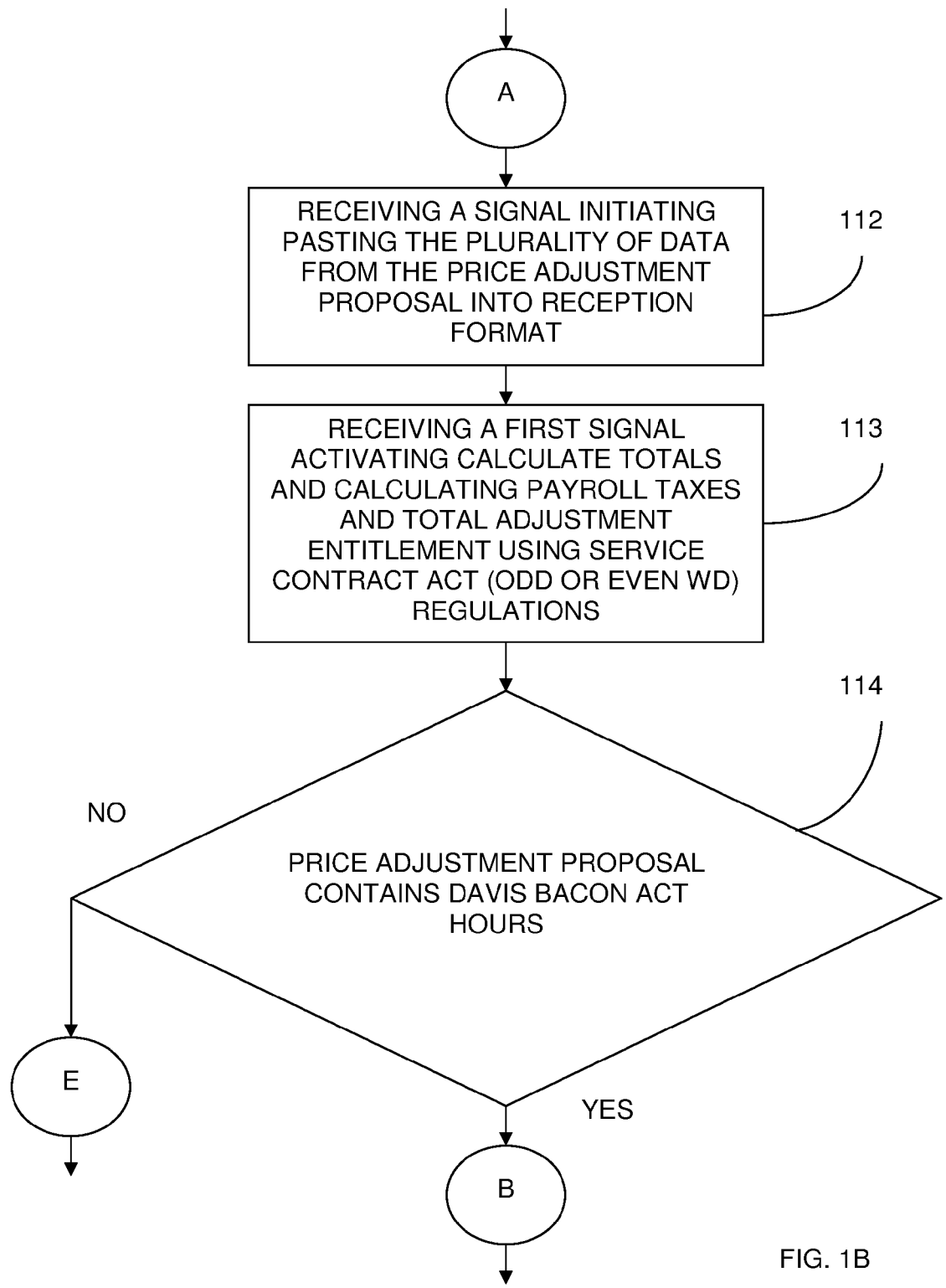
FIG. 1B further illustrates elements of the method of calculating, analyzing, determining compliance with FAR and CFR requirements, determining allowability, allocability and adjusting contract prices due to the impact of SERVICE CONTRACT ACT wage adjustment rules and regulations.
Figure 1C:
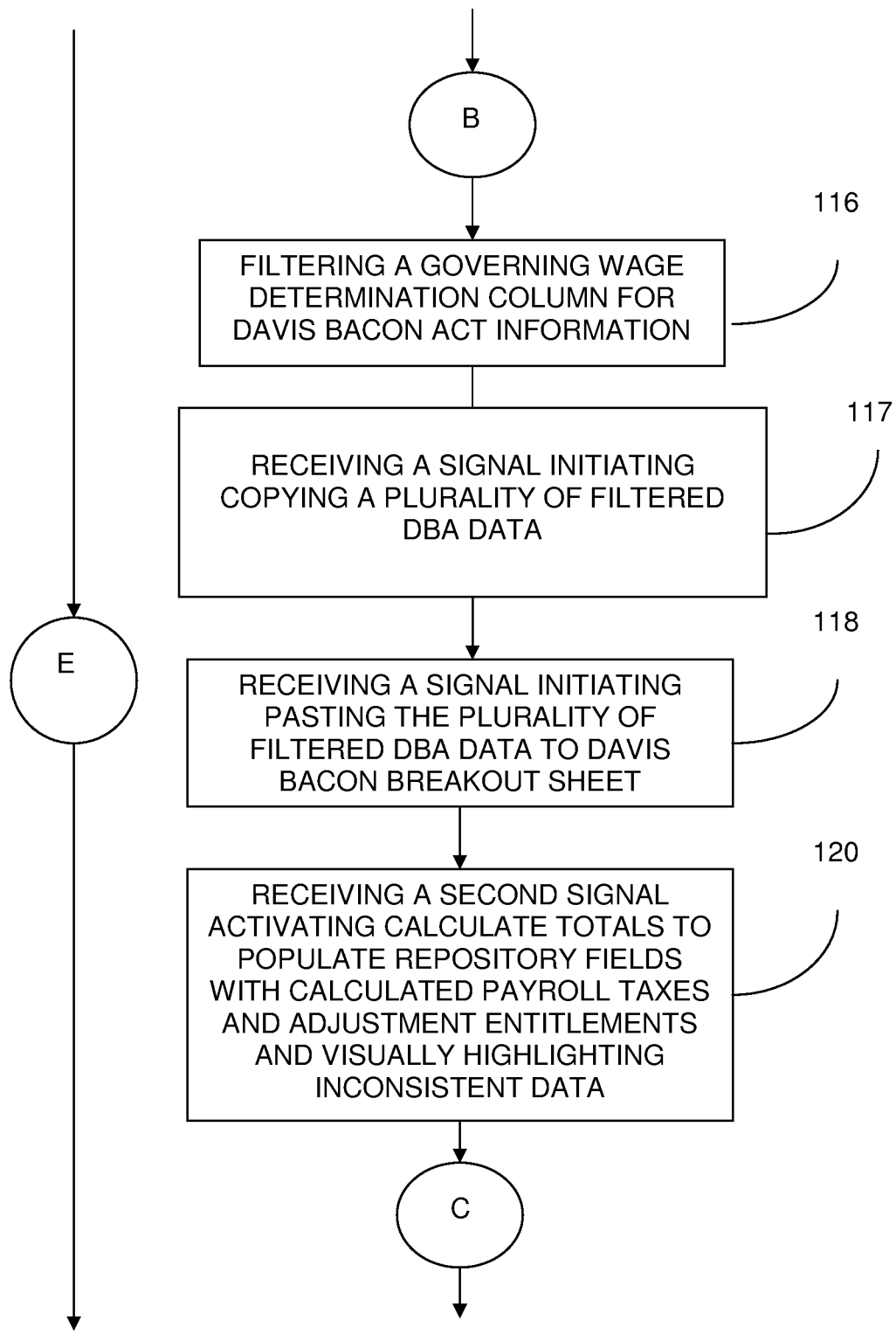
FIG. 1C further illustrates elements of the method of calculating, analyzing, determining compliance with FAR and CFR requirements, determining allowability, allocability and adjusting contract prices due to the impact of SERVICE CONTRACT ACT wage adjustment rules and regulations.

In exemplary embodiments, referring to FIG. 1B, FIG. 1C and FIG. 2, the method 100 executed by the computer processor 206, residing in the system 200, can call various algorithms, such as the algorithms A1, through algorithm An or execute programmatic routines or macro or micro programs to input and/or retrieve data and/or information into and out of the repository entry locations R90 through Rn residing in the dynamic repository 210 and cause such data to interact with other algorithms and/or macro or micro programs or programmatic routines executing in the method 100 and/or method 300 program code. Such data can be gathered and/or input programmatically into the algorithms, or programmatic routines or macro or micro programs and strings in the program code of the method 100 where calculations and determinations or programmatically performed by the method 100 and/or the method 300, based on the program code executed by the computer processor 206 residing in the system 200.

Figure 9A:
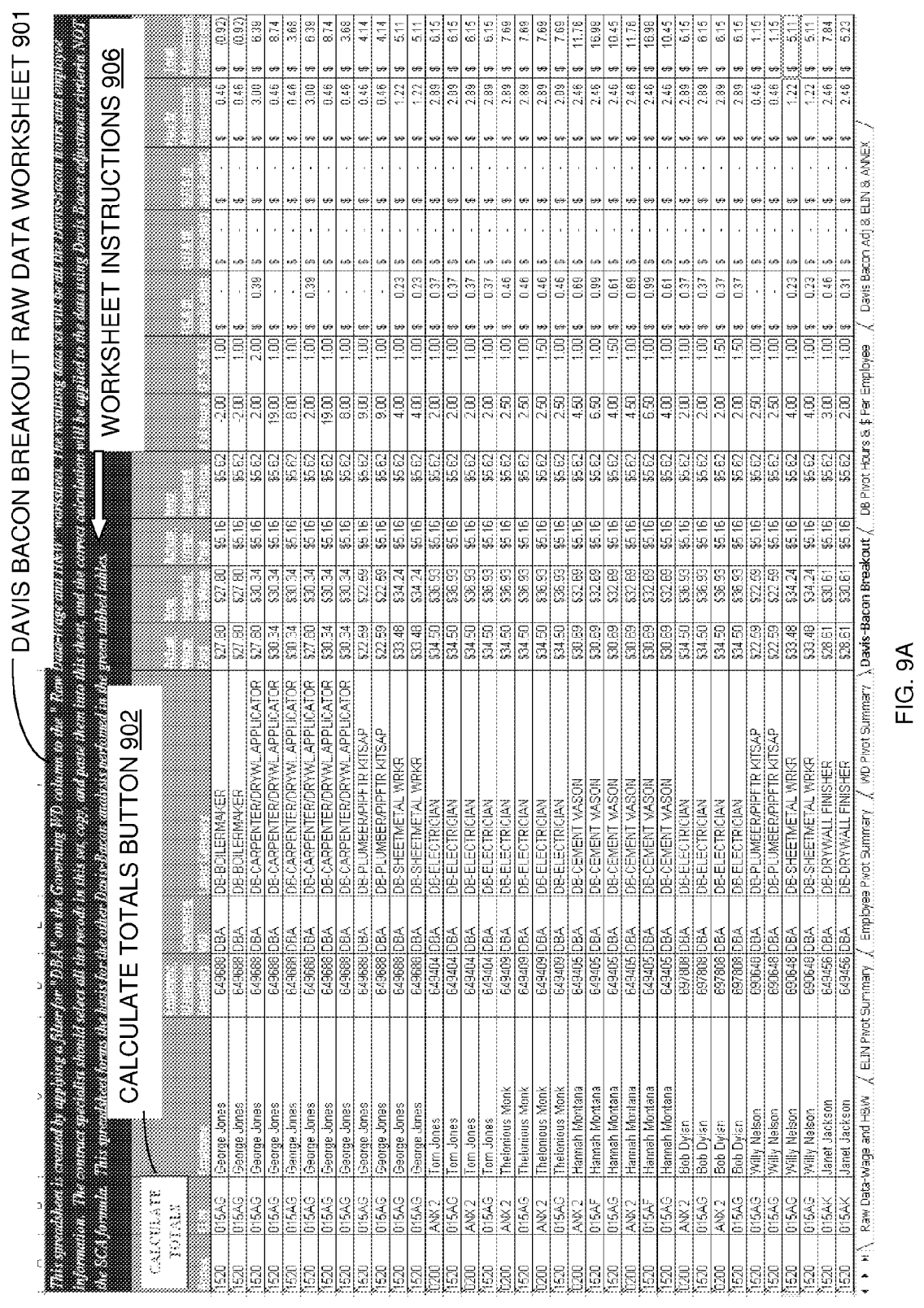
Figure 9B:
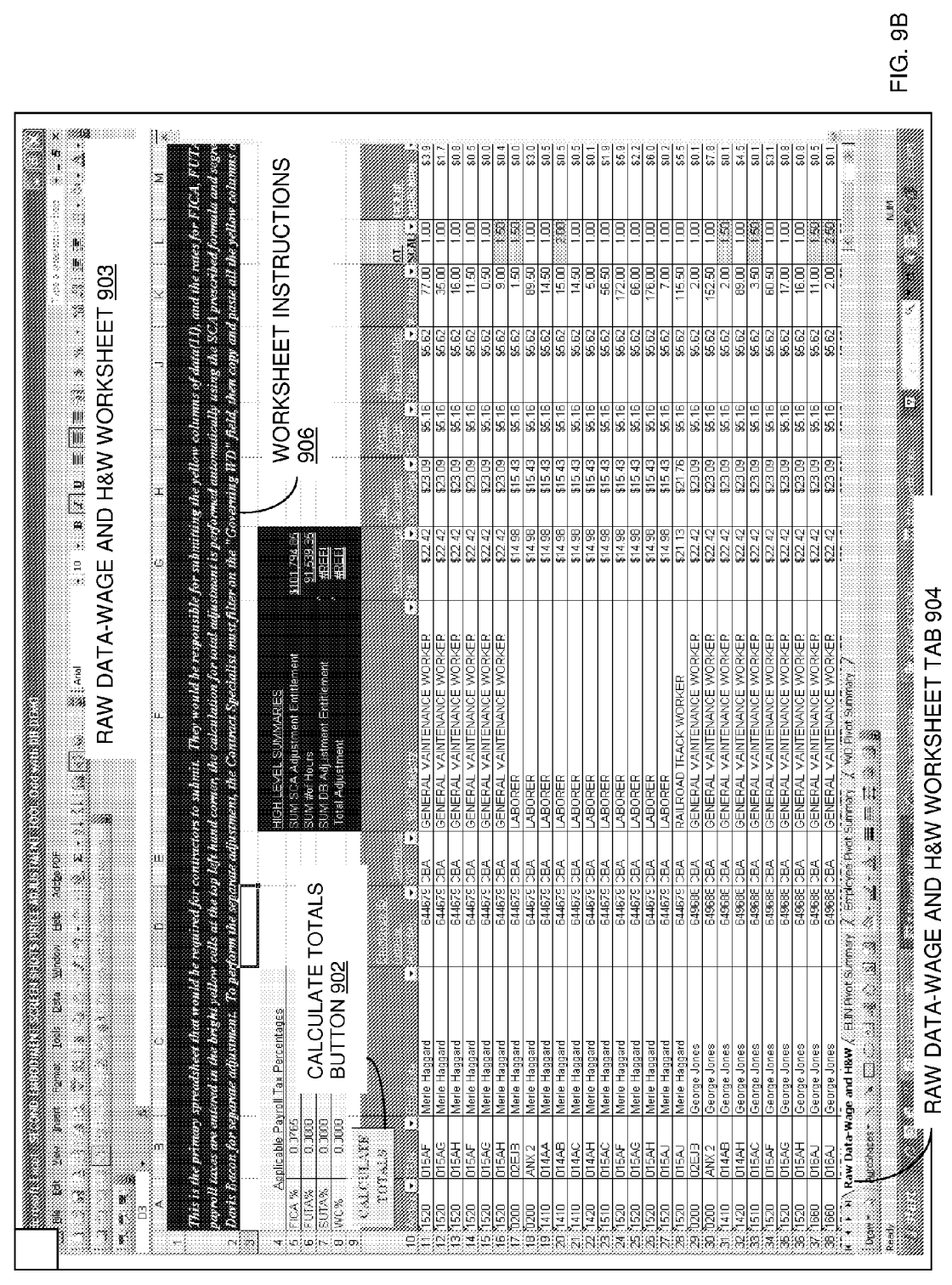

In exemplary embodiments, referring to FIG. 9A and FIG. 9B, a calculate totals button 902 can be programmatically designated in the spreadsheet 205. The program code of the method 100 and/or the method 300 executed by the computer processor 206, causes the computer processor 206 to automatically designate one or more buttons, or icons or tabs in the spreadsheet 205 of the user interface 204. The designated buttons include the calculate totals button 902 for one or more tabs including a tab representing raw data wage health and welfare information (such as the Raw Data Wage and H&W worksheet tab 904) in a data repository, such as the dynamic repository 210, for storing raw data and the calculate totals button 902 representing DAVIS BACON ACT breakout pivot summary information (see FIG. 9A) in a data repository for storing DAVIS BACON ACT breakout information in a menu/template of a graphical user interface, such as the user interface 204. In exemplary embodiments, the designating of the calculate totals button 902 includes highlighting, shading, colorizing, enlarging the size or flashing the cells on the user interface 204, in accordance with the method 100 implemented in the system 200 as the SCA PACTp.

Referring to FIG. 1A, FIG. 1B, FIG. 2, FIG. 9A and FIG. 9B, in accordance with the first exemplary embodiment, at an operation receiving a first signal activating calculate totals and calculating payroll taxes and total adjustment entitlement using SERVICE CONTRACT ACT (odd or even WD) regulations 113 (hereafter "the operation 113"), the program code of the method 100 executed by the computer processor 206, causes the computer processor 206 to automatically perform an operation of calculating payroll taxes and total adjustment entitlement using SERVICE CONTRACT ACT (odd or even wage determination) regulations. The calculate totals button 902 can be created programmatically in the spreadsheet 205 software application package. The calculate totals button 902 can be programmatically positioned anywhere on the spreadsheet 205. In the exemplary embodiments, the calculate totals button 902 can be positioned on the top left portion of the screen and highlighted and/or raised with a three dimensional effect and/or colorized and/or flashing. The computer processor 206 receives a signal from the user and/or operator or contract specialist or the signal can be transmitted over the network 272 and received by the computer processor 206 or the request may be input through the input device 252 by a user of the computer processor 206.

Referring to FIG. 1B and FIG. 1C, receiving a first signal and/or a second signal activating the calculate totals button 902 for the operation 113 and an operation 120, respectively, in accordance with the first exemplary embodiment, typical contract price adjustment entitlements are determined for SERVICE CONTRACT ACT applicable lines of data using SCA regulations. The method 100 displays a statement directing the user to initiate separate processes for DAVIS BACON ACT applicable lines of data entered into DAVIS BACON ACT applicable cells in the total adjustment entitlement column on the Raw Data Wage and H&W worksheet tab 904. The statement can be in a text box, at the top of the tab which directs the user to filter, copy and past the DBA applicable rows of data into a tab marked DAVIS BACON breakout(see the RAW DATA-WAGE AND H&W WORKSHEET 903 in FIG. 9B). The text box can be colorized, to include a blue color). Additional operation iterations performed in the operation 120 are performed for DAVIS BACON ACT data only and data resulting from the operations are populated in the DAVIS BACON breakout tab.

Figure 3A:
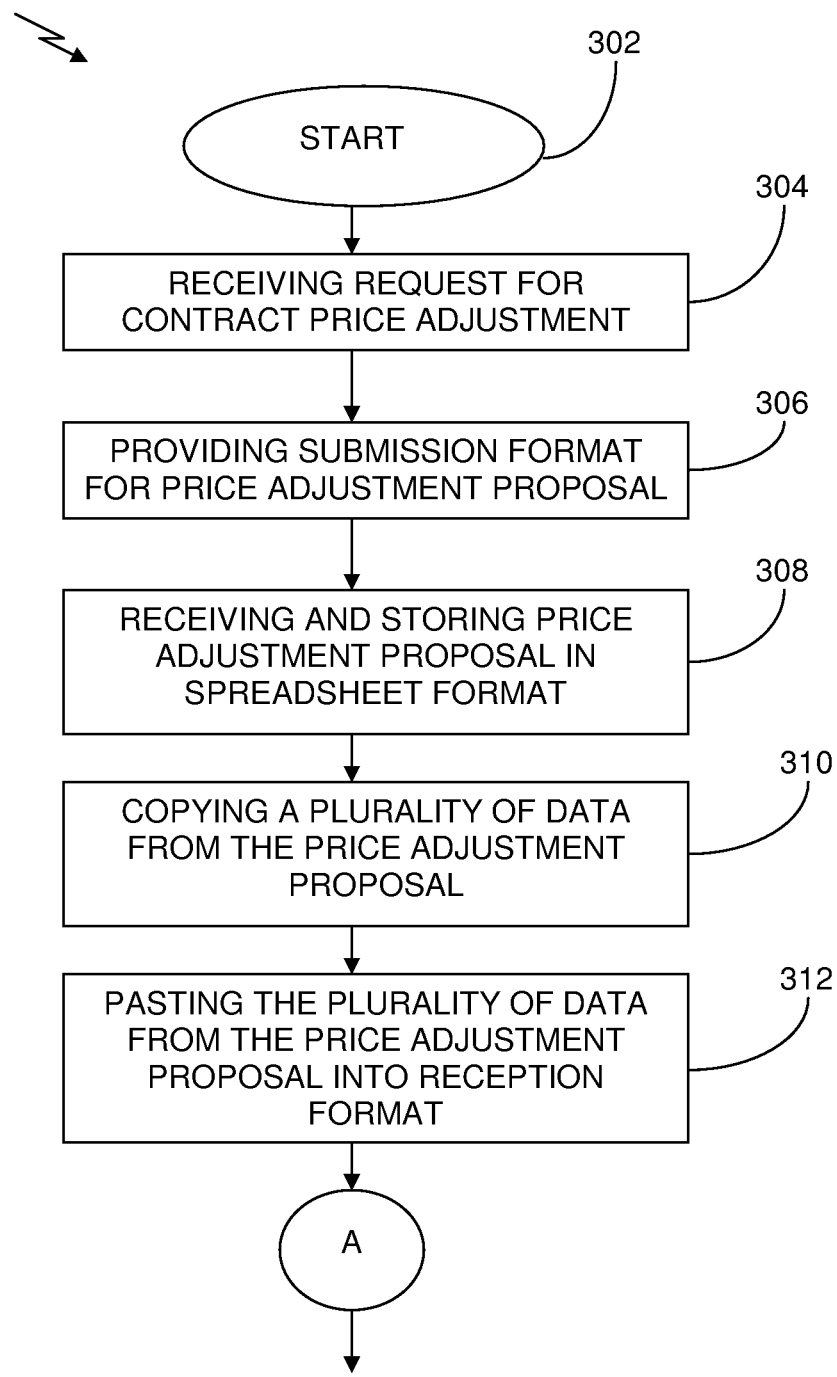
FIG. 3A illustrates elements of the method (using combined formulas) of calculating, analyzing, determining compliance with FAR and CFR requirements, determining allowability, allocability and adjusting contract prices due to the impact of SERVICE CONTRACT ACT wage adjustment rules and regulations for exercising options on multi year contracts and on anniversaries of multi year contracts.
Figure 3B:
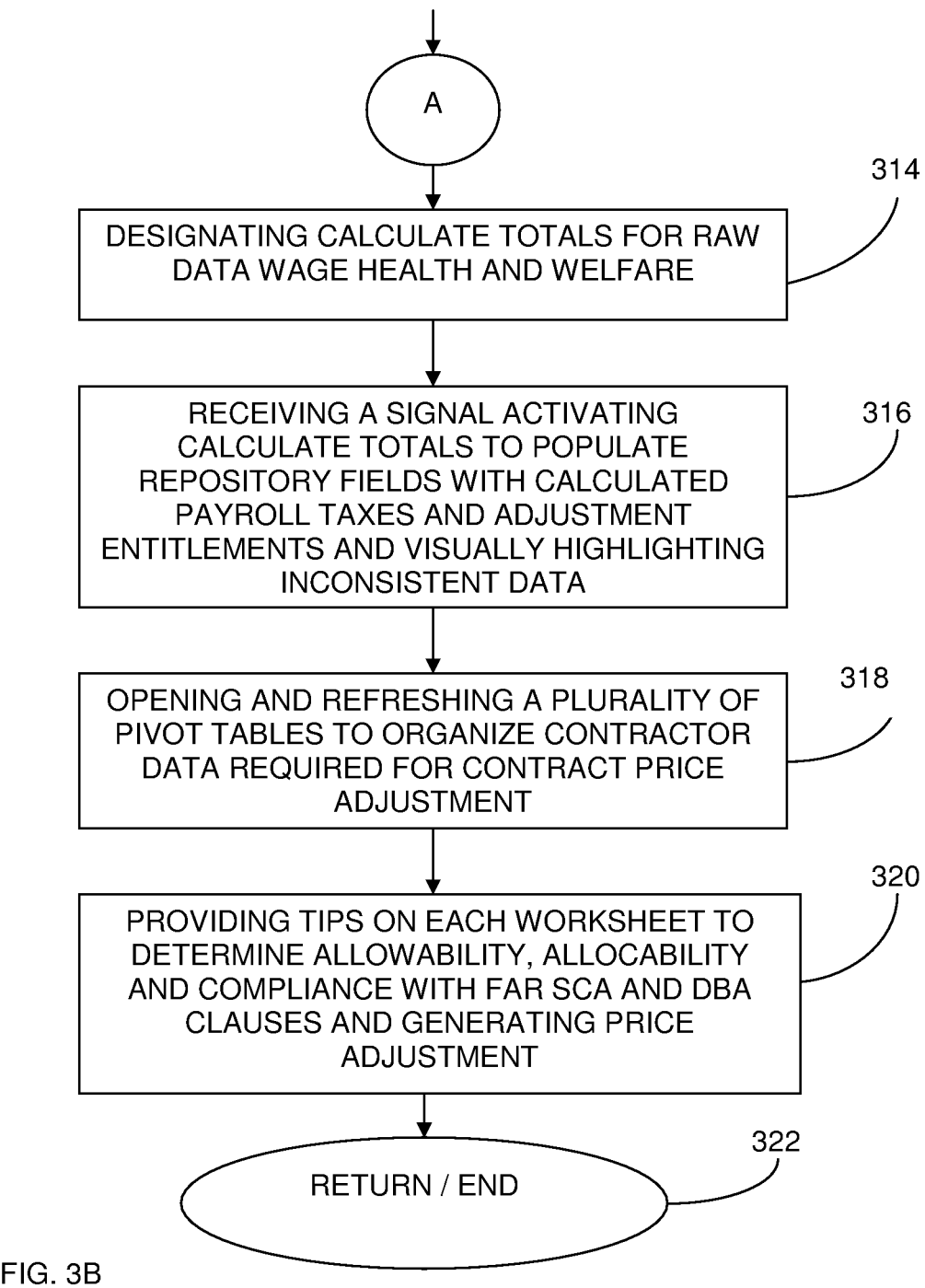
FIG. 3B further illustrates elements of the method (using combined formulas) of calculating, analyzing, determining compliance with FAR and CFR requirements, determining allowability, allocability and adjusting contract prices due to the impact of SERVICE CONTRACT ACT wage adjustment rules and regulations for exercising options on multi year contracts and on anniversaries of multi year contracts.

In exemplary embodiments, referring to FIG. 1C, FIG. 3B, FIG. 9B and/or FIG. 9A and elements designating the operations 113, 120 and 320 respectively, upon activation of the calculate totals button 902, a string of visual basic code is run to apply formulas for payroll taxes and contract price adjustment entitlements to each line of data in the spreadsheet 205.

As a result of activating the calculate totals button 902 (with visual basic code and/or other programmatic algorithms and/or macroprograms enabled in the application of the spreadsheet 205), numerical values, which are calculated based on activating the calculate totals button 902 are populated in the price adjustment tool sheet, so as to populate a plurality of columns (each column having a title) in the spreadsheet 205. This is the primary spreadsheet that contractors would use to submit the required data (see FIG. 13A and FIG. 13B). The contractor is responsible for submitting data in the columns A-L (see FIG. 13A). These columns A-L can be colorized, for example using yellow columns to represent columns (A-L). Columns A-L represent columns titled Annex, ELIN, Employee, Employee ID (unique identifier), Governing WD, Labor Category, Old Wage Required, Actual Wage Paid, New Required Min Wage, Old Fringe Required, Actual Fringe Paid, New Required Min Fringe, # of hours, and OT SCALE, as well as the rates for FICA, FUTA, SUTA & WC. When the percentages for payroll taxes are entered in the bright yellow cells of the columns A-L at the top left hand corner, the calculation for total adjustment is performed automatically using the SCA prescribed formula for even numbered WD's, and segregates those hours and employees representative of a plurality of Davis Bacon workers for separate adjustment. In exemplary embodiments the yellow colorization may instead be any form of visual designation, indication, or representation including highlighting, blinking or shading. To perform the separate adjustment, the Contract Specialist must filter on the "Governing WD" field, then copy and paste all the data from the columns A-L (yellow columns) onto the DAVIS BACON Breakout Raw Data Worksheet 901 (see FIG. 9A).

In the first exemplary embodiment, under the Raw Data Wage and H&W worksheet tab 904 of the spreadsheet 205, the titles of the columns populated with the calculated values include: FICA (if applicable), FUTA (if applicable), SUTA (if applicable), and Total Adjustment Entitlement (see FIG. 9A and FIG. 9B). In the first exemplary embodiment, at cell 11 in the column titled FICA (if applicable), values for FICA are calculated using the formula:

$$=(\$B\$5*(\$H11-\$G11))*K11 \quad (1).$$

Where, a formula number (2) follows suit for all of the cells in the column for FICA.

Correspondingly, the formula for the column titled FUTA (if applicable) will follow the formula format of:

$$=(\$B\$6*(\$H11-\$G11))*K11 \quad (2).$$

Further, correspondingly, the formula for the column titled SUTA (if applicable) will follow the formula format of:

$$=(\$B\$7*(\$H11-\$G11))*K11 \quad (3).$$

In the preceding formulas (i.e., formula (1), formula (2) and formula (3)), B represents ELIN values for a given row in the column titled ELIN; thus, in said preceding formulas, $B$5, $B$6 and $B$7 (along with WC, i.e., workman's compensation) are constants representing applicable payroll tax percentages for FICA, SUTA and FUTA respectively, depending on which state(s) in the United States is/are applicable, that are used by the program code of the method 100 to multiply across all of the other relational variables utilized in the program code of the method 100. However, although treated as constants in the formulas, these applicable payroll tax percentages can be changed by the operator and/or user and/or contract specialist and/or automatically and/or programmatically changed by Wage Determination Online Homepage (WDOL) of the U.S. Department of Labor, if the WDOL rates increase or decrease, so as to reflect the correct and prevailing legal percentage to preclude the contractor from receiving an incorrect valuation; such automatic changes are not known in the art. Further in the formulas, H represents new required minimum wage values for each row in the column titled New Required Min Wage. Also, G represents values for Actual Wage Paid in a given row in the column titled Actual Wage Paid in the column. And K represents values for a number of hours in a given row in the column titled number (#) of hours. In the column titled Total Adjustment Entitlement, the following formula (i.e., formula (4)) is applied to each row in the spreadsheet 205, providing the calculated total adjustment entitlement, (see FIG. 12):

$$=IF(E11="DBA","see DB Breakout sheet",(((H11-G11)+(J11-I11))*K11)+SUM(M11:O11))\ (4).$$

Formula (4) represents a situation, where if and/or when the governing wage determination is a DAVIS BACON ACT wage determination, then the method 100 and/or system 200 consults the DAVIS BACON ACT breakout sheet. If the governing wage determination is not a DAVIS BACON ACT wage determination, then the method 100 implemented in the system 200 carries out calculations in regard to the SERVICE CONTRACT Act determinations represented by the following formula number (5).

Formula (5) derives a different result for DAVIS BACON ACT entries than results derived for SERVICE CONTRACT ACT entries, by programmatically applying the correct corresponding contract law for one or more of either DAVIS BACON ACT entries and/or SERVICE CONTRACT ACT entries:

$$(((H11-G11)+(J11-I11))*K11)+SUM(M11:O11)).$$
(NOTE: SUM(M11:O11) is the same as SUM
$$(M11+N11+O11 \quad (5).$$

Formula (5) designates which section and/or sections of the Federal Acquisition Regulations are used in determining how much price adjustment money a given contractor is entitled to, in regard to the contractor's proposed price adjustment. In the first exemplary embodiment, H11 represents the new required minimum wage; G11 represents the actual wage paid; K11 represents the number of hours; M11 represents FICA, N11 represents FUTA, and O11 represents SUTA. In the exemplary embodiments, FICA, FUTA and SUTA are means to an end, where the end is the Total Adjustment Entitlement determination. Thus, formula (5) is subtracting the value of the old wage from the new wage and adding that to the result of the new fringe minus the old fringe; and multiplying this result by the hours and then adding FICA, FUTA and SUTA values. These operations are performed separately; thus the result is not the combination of wage plus fringe.

In the DAVIS BACON ACT breakout sheet of the spreadsheet 205, another important formula is the DAVIS BACON ACT Total Hourly Adjustment formula of the first exemplary embodiment:

$$IF((G11+I11)>=(H11+J11),0,(H11+J11)-(G11+I11) \quad (6).$$

Wherein, this DAVIS BACON ACT total hourly adjustment formula (6) is interpreted as follows: If the sum of Actual Wages+Actual Fringe is greater than or equal to the sum of New Required Wages+Fringe, then perform no adjustment for that row of data. If Actual Wages+Fringe is less than or equal to the sum of New Required Wages+New Required Fringe, then adjust that row of data in the amount of the difference of New Required Wage+New Required Fringe and Actual Wage Paid+Actual Fringe Paid. The difference in the law for DAVIS BACON ACT verses SERVICE CONTRACT ACT requirements is that if a contractor has a plurality of workers performing construction work under the DAVIS BACON ACT, the contractor must pay those workers the collective total combination of their wage amount plus the fringe benefit amount required by the DAVIS BACON ACT; therefore, referring to FIG. 6, the DAVIS BACON ACT requires that George Jones the Boilermaker must make $27.80 in his wage and $5.16 in his fringe, in order for the contractor to be in compliance with the DAVIS BACON ACT regulations. However, the SERVICE CONTRACT ACT does not work like the DAVIS BACON ACT. The formula (6) represents that the combination of G+I which is actual wage paid plus actual fringe paid (respectively); each element (wage or fringe benefit) must independently meet the new required minimum for that respective element in the new wage determination.

Another important formula of the first exemplary embodiment is the DAVIS BACON ACT breakout Total Adjustment Entitlement formula, which is:

$$=(P2*K2)+\mathrm{SUM}(M2:O2) \qquad (7).$$

Formula (7) represents Multiplying the value in the Total Hourly Adjustment Formula by the number of hours specified for that row of data and add in payroll taxes, where P represents hourly adjustments.

Referring to FIG. 1A, FIG. 1B, and FIG. 2, in accordance with the first exemplary embodiment, at a determining operation price adjustment proposal contains DAVIS BACON ACT hours 114 (hereafter "the determining operation 114"), the program code of the method 100 executed by the computer processor 206, causes the computer processor 206 to automatically determine either, whether the price adjustment proposal submitted by the contractor contains DAVIS BACON ACT hours or whether the price adjustment proposal submitted by the contractor does not contain DAVIS BACON ACT hours. The program code of the method 100 causes the spreadsheet 205 to figuratively think, by always searching for DAVIS BACON ACT information, because DAVIS BACON ACT information is what is different, i.e. DAVIS BACON ACT information entries from the contractor are not the norm. The normal entries are SERVICE CONTRACT ACT entries. Generally, contracts with DAVIS BACON ACT information do not require price adjustments, unless the contract is a combined contract, i.e., including SERVICE CONTRACT ACT information with DAVIS BACON ACT information; that is where both SERVICE CONTRACT ACT employees and DAVIS BACON ACT employees are working under the same combined contract. Or, in the first exemplary embodiment, the program code of the method 100 can also look for SERVICE CONTRACT ACT information instead of DAVIS BACON ACT information and continue to process the method 100 with a major focus on SERVICE CONTRACT ACT entries. Thus, in exemplary embodiments filtering can be designated for one or more of either DAVIS BACON ACT information (i.e., either construction worker information) or SERVICE CONTRACT ACT information (i.e., service contract worker information). However, there is more economy of effort in filtering for the outliers (i.e., DAVIS BACON ACT information) which are not the norm, instead of filtering for the norm, i.e., SERVICE CONTRACT ACT entries.

Referring again to FIG. 1A, FIG. 1B, FIG. 1C, FIG. 1D and FIG. 2, in the first exemplary embodiment, the contractor is required to distinguish DAVIS BACON ACT hours from SERVICE CONTRACT ACT hours in the contractor's submitted proposal and/or request. When the method 100, executed by the computer processor 206, determines that the price adjustment proposal submitted by the contractor does not contain DAVIS BACON ACT hours, then the method 100 causes the computer processor 206 to perform an operation of opening tabs and refreshing pivot tables (see operation 122B). When the method 100, executed by the computer processor 206, determines that the price adjustment proposal submitted by the contractor does contain DAVIS BACON ACT hours at the determining operation 114, then the method 100 causes the computer processor 206 to filter a governing wage determination column at an operation 116 and the computer processor 206 continues to a calculating operation (at the operation 120) by designating calculate totals buttons, such as the calculate totals button 902, for one or more of either SCA data wage information and/or DAVIS BACON ACT information, thus transforming the contractor raw data into the allowable, allocable and compliant total contract price adjustment data. In accordance with the above descriptions of the first exemplary embodiment, when there is no DAVIS BACON ACT information in the contractor's proposed price adjustments, then the method 100 continues directly to operation 122B from the NO determination result of the determining operation 114, because there would be no reason to copy and paste data and filter DAVIS BACON ACT data, if there is no DAVIS BACON ACT data in the contractor's proposal. If there is DAVIS BACON ACT information in the contractor's proposed price adjustments, then the method 100 continues from the YES determination result via the operations 116 through to operation 124. Thus, the operations of the method 100 are continued, as indicated by either the continuation oval labeled as the letter B at the bottom of FIG. 1B and continued at the top of FIG. 1C, or the operations of method 100 are continued, as indicated by the continuation ovals labeled as the letter E at the left bottom portion of FIG. 1B, continuing past FIG. 1C and continuing on to operation 122B towards the bottom of FIG. 1D.

Referring to FIG. 1A, FIG. 1B, FIG. 1C, FIG. 2 and FIG. 9B, in accordance with the first exemplary embodiment, at an operation filtering a governing wage determination column for DAVIS BACON ACT information 116 (hereafter "the operation 116"), the program code of the method 100 executed by the computer processor 206, causes the computer processor 206, upon activation by the operator/user and/or the contract specialist, to filter a governing wage determination column in the Raw Data Wage and H & W Worksheet 903 of the spreadsheet 205, for DAVIS BACON ACT information and/or hours on the Raw Data Wage and H&W worksheet tab 904 (see FIG. 9A and FIG. 9B), where the Raw Data Wage and H&W worksheet tab 904 is exhibited on the user interface 204. The method 100 causes the computer processor 206 to create a filtered column of governing wage determination information by populating the column containing governing wage determination information in the spreadsheet 205 with a filtered version of DAVIS BACON ACT information and the filtered version is indicated in the information on the Raw Data Wage and H&W worksheet tab 904. The user, operator, and/or contract specialist transmits a signal via the input device 252 which is received by the computer processor 206. Based upon receipt of the signal transmitted by the user, the program code of the method 100 causes the governing wage column to be filtered by the user, thus isolating the records to which DAVIS BACON ACT data applies. Along with the filtered column, the method 100 includes a designated instruction box (i.e., text box) in the spreadsheet 205, which contains textual instructions (such as the worksheet instructions 906 (see FIG. 9B)) for the user and/or operator and/or contract specialist to use as a guide in conducting filtering operations, in regard to the method 100. The worksheet instructions 906 include the following guidelines: To perform the separate adjustment, the Contract Specialist must filter on the "Governing WD" field, then copy and paste data from columns A-L. Where, the columns A-L can be highlighted or colorized as yellow columns, onto the Davis Bacon Breakout spreadsheet. In exemplary embodiments, the designated instruction box can be a colorized text box having a blue background fill. In exemplary embodiments, the designated instruction box can also be a highlighted text box or a flashing text box, or the highlighting can be effected by shading or texture fill, within the text box. Upon creation of the filtered version of DAVIS BACON ACT information, by the method 100, the computer processor 206 is caused, by the method 100, to copy the DAVIS BACON ACT records from the filtered version of DAVIS BACON ACT information found in the Raw Data Wage and H&W Worksheet 903 under the Raw Data Wage and H&W worksheet tab 904 and then paste the copied records from the filtered version of DAVIS BACON ACT data/information (such as filtered DAVIS BACON ACT data 211, which is stored in repository entry location R90 of the dynamic repository 210) on the DAVIS BACON ACT breakout repository, which can be designated by a DAVIS BACON ACT breakout tab.

Referring again to FIG. 1A, FIG. 1B, FIG. 1C and FIG. 2, in accordance with the first exemplary embodiment, at the operation 116, the computer processor 206 receives a signal from the user and/or the operator and/or the contract specialist, via the input device 252, to activate and/or open a down arrow tab or some other type of icon to activate the filtering operation at the operation 116. Upon activating the drop down arrow and/or icon, the method 100 causes the computer processor 206 to display a drop down menu providing the user and/or the operator and/or the contract specialist a selection to select from the menu items including: Sort Ascending, Sort Descending, All, Top 10, DBA, SCA and/or Blanks and Non-Blanks. In regard to the filtering operation, i.e., the operation 116, when DBA is selected, then the method 100 causes the computer processor to only display the DBA entries in the spreadsheet 205 on the display 202. Thus, all other entries are filtered out of the display 202. This type of filtering, i.e., filtering for DBA and/or SCA can be implemented into any of the columns, not just the Governing WD column.

Referring to FIG. 1A, FIG. 1B, FIG. 1C, FIG. 2, FIG. 9A and FIG. 9B, in accordance with the first exemplary embodiment, at an operation receiving a signal initiating copying a plurality of filtered DBA data 117 (hereafter "the operation 117"), the program code of the method 100 executed by the computer processor 206, causes the computer processor 206, upon receipt of a signal from the user and/or the operator and/or the contract specialist via the input device 252, to highlight and copy, the filtered DAVIS BACON ACT information starting at the annex column and continue across the spreadsheet 205 including the over time scale (OT Scale) column and then all the way down including every row of data, thus capturing this highlighted filtered DBA data from the entire Raw Data Wage and H & W Worksheet 903 (see FIG. 9B). What is copied is a filtered subset of data for DAVIS BACON ACT employee information.

Referring to FIG. 1A, FIG. 1B, FIG. 1C, FIG. 2 and FIG. 9A, in accordance with the first exemplary embodiment, at an operation receiving a signal initiating pasting the plurality of filtered DBA data to a DAVIS BACON breakout sheet 118 (hereafter "the operation 118"), the program code of the method 100 executed by the computer processor 206, causes the computer processor 206, upon receipt of a signal from the user and/or the operator and/or the contract specialist via the input device 252, to past the plurality of DBA data and/or including filtered DBA hourly pay rates copied from the governing WD column to the spreadsheet 205 into corresponding columns and rows of another sheet of the spreadsheet 205, designated by the DAVIS BACON breakout tab in the DAVIS BACON Breakout Raw Data Worksheet 901 (see FIG. 9A). The corresponding columns and rows are pasted into the spreadsheet 205, starting at the annex column and across the spreadsheet 205 including the OT Scale column and then all the way down including every row of data, thus capturing this highlighted filtered DBA data. In exemplary embodiments, this DAVIS BACON breakout tab may be colorized to be green or some other color or this tab may be designated by highlighting or shading or texturization or caused to flash. In exemplary embodiments, a plurality of tabs may be designated as DAVIS BACON breakout tabs.

Referring to FIG. 1A, FIG. 1B, FIG. 2, FIG. 9A and FIG. 9B, in accordance with the first exemplary embodiment, at an operation receiving a second signal activating calculate totals on the DAVIS BACON breakout tab to populate repository fields with calculated payroll taxes and adjustment entitlements and visually highlighting inconsistent data 120, (hereafter "the operation 120"), the program code of the method 100 executed by the computer processor 206, upon receipt of a programmatic signal from the program code of the method 100 or a manual signal from the input device 252, such as a signal initiated by a user/operator or Government Contract Specialist or receipt of such a signal transmitted over the network 272, selecting the calculate totals button(s) 902 via the input device 252, causes the computer processor 206 to automatically activate the designated calculate totals button(s) 902 for raw data wage and DAVIS BACON ACT information calculations. In exemplary embodiments, the calculate totals button 902 can be programmatically designated by the program code of the method 100; thus, causing the computer processor 206 to automatically display the designated calculate totals button 902 and/or buttons in the user interface 204 of the spreadsheet 205 on the display 202. In exemplary embodiments, the designating of the calculate totals button(s) 902 includes highlighting, shading, colorizing, enlarging the size or flashing on the user interface 204, in accordance with the program code of the method 100 implemented in the system 200 as the SCA PACTp. The program code of the method 100 executed by the computer processor 206, causes the computer processor 206 to automatically perform an operation of calculating payroll taxes and total adjustment entitlement using SERVICE CONTRACT ACT (odd or even wage determination) regulations, when the calculate totals button 902 is activated by the user/operator and/or contract specialist. The computer processor 206 receives a signal to activate the calculate totals button 902 from the user and/or operator or contract specialist or the signal can be transmitted over the network 272 and received by the computer processor 206 or the request may be input through the input device 252 by a user of the computer processor 206.

In accordance with the first exemplary embodiment, as a result of activating the calculate totals button 902 (with algorithms and/or macroprograms enabled in the application of the spreadsheet 205), numerical values, which are calculated, based on activating the calculate totals button 902, are populated in the price adjustment tool sheet, so as to populate a plurality of columns in the spreadsheet 205. The plurality of columns include FICA (if applicable), FUTA (if applicable), SUTA (if applicable), Hourly Adjustment Entitlement, and Total Adjustment Entitlement.

In exemplary embodiments, the operation 120 includes buttons such as the calculate totals button 902 for a sheet showing DAVIS BACON ACT breakout pivot summary information (see FIG. 9A and FIG. 9B) in a data repository for storing DAVIS BACON ACT breakout information in a menu/template of a graphical user interface, such as the user interface 204.

Again referring to FIG. 1B, FIG. 1C, and FIG. 2, in accordance with the first exemplary embodiment, at the operation 120, the program code of the method 100 executed by the computer processor 206, causes the computer processor 206 to automatically calculate payroll taxes and price adjustment entitlements, based on the activation of the calculate totals button 902 for the DAVIS BACON ACT breakout tab rendered on the user interface 204. In exemplary embodiments, upon activation of the calculate totals button 902, a string of visual basic code is run to apply formulas for payroll taxes and adjustment entitlements to each line of data in the spreadsheet 205. The operation 120 is implemented by the program code of the method 100 calling algorithms and executing, by the system 200, of the price adjustment formulas including:

$$=(\$B\$5*(\$H11-\$G11))*K11 \quad (1);$$

$$=(\$B\$6*(\$H11-\$G11))*K11 \quad (2);$$

$$=(\$B\$7*(\$H11-\$G11))*K11 \quad (3);$$

$$=IF(E11=\text{``DBA''},\text{``see DB Breakout sheet''},(((H11-G11)+(J11-I11))*K11)+SUM(M11:O11)) \quad (4);$$

$$(((H11-G11)+(J11-I11))*K11)+SUM(M11:O11)).$$
(NOTE: SUM(M11:O11) is the same as SUM(M11+N11+O11)) (5);

$$IF((G11+I11)>=(H11+J11),O,(H11+J11)-(G11+I11)) \quad (6); \text{ and}$$

$$=(P2*K2)+SUM(M2:O2) \quad (7).$$

In the DAVIS BACON ACT formulas and the SERVICE CONTRACT ACT formulas, hours can be multiplied in one formula, or broken out and multiplied in different formulas for different columns, where payroll taxes can be added in a separate column and then multiplied by the number of hours K.

Referring to FIG. 1A, FIG. 1B, FIG. 1C, FIG. 1D and FIG. 2, in accordance with the first exemplary embodiment, at the operation 120, the program code of the method 100 executed by the computer processor 206, causes the computer processor 206 to automatically fill down (i.e., populate) data fields of the spreadsheet 205 with data/values for payroll taxes and appropriate adjustment entitlements using applicable SERVICE CONTRACT ACT and DAVIS BACON ACT federal acquisition regulation requirements. The method 100 uses applicable SERVICE CONTRACT ACT and DAVIS BACON ACT federal acquisition regulation requirements to determine which data fields of the spreadsheet are populated and to determine which data elements are appropriate data elements for data summarization and visualization in a plurality of pivot tables displayed on the display 202 within the spreadsheet 205 associated/managed/manipulated by/with the user interface 204.

Referring to FIG. 1A, FIG. 1B, FIG. 1C, FIG. 1D and FIG. 2, in accordance with the first exemplary embodiment, at the operation 120, the program code of the method 100 executed by the computer processor 206, causes the computer processor 206 to automatically apply appropriate payroll taxes specified by the user, operator and/or contract specialist in the spreadsheet 205. The program code of the method 100, when executed by the system 200 causes the system 200 to visually highlight inconsistent data for the user, operator and/or the contract specialist to investigate further. Also, the system presents instructions which detail what the user, operator and/or contract specialist should do with the inconsistent data. The inconsistent data can result from the series of calculations, in regard to payroll taxes and price adjustment entitlements. In exemplary embodiments, the system 200 will determine what is inconsistent data and designate a cell or cells in the spreadsheet 205 that contain the inconsistent data. In exemplary embodiments, the cell or cells can be designated by highlighting, colorizing, and/or flashing and/or enlarging of the text within the cell(s). Thus, the user, operator and/or contract specialist can easily detect and further analyze any inconsistent data.

Again referring to FIG. 1B, FIG. 1C, FIG. 1D and FIG. 1E, in accordance with the first exemplary embodiment, if there is no DAVIS BACON ACT information in the contractor's proposed price adjustments, then the method 100 continues, according to the ovals labeled E directly to operation 122B from the NO determination result of the determination operation 114. Recall, that if there is DAVIS BACON ACT information in the contractor's proposed price adjustment, then the method 100 continues from the YES determination result via the operations 116 through 120. There would be no reason to copy and paste data and filter DAVIS BACON ACT data, if there is no DAVIS BACON ACT data in the contractor's proposal.

Figure 1D:
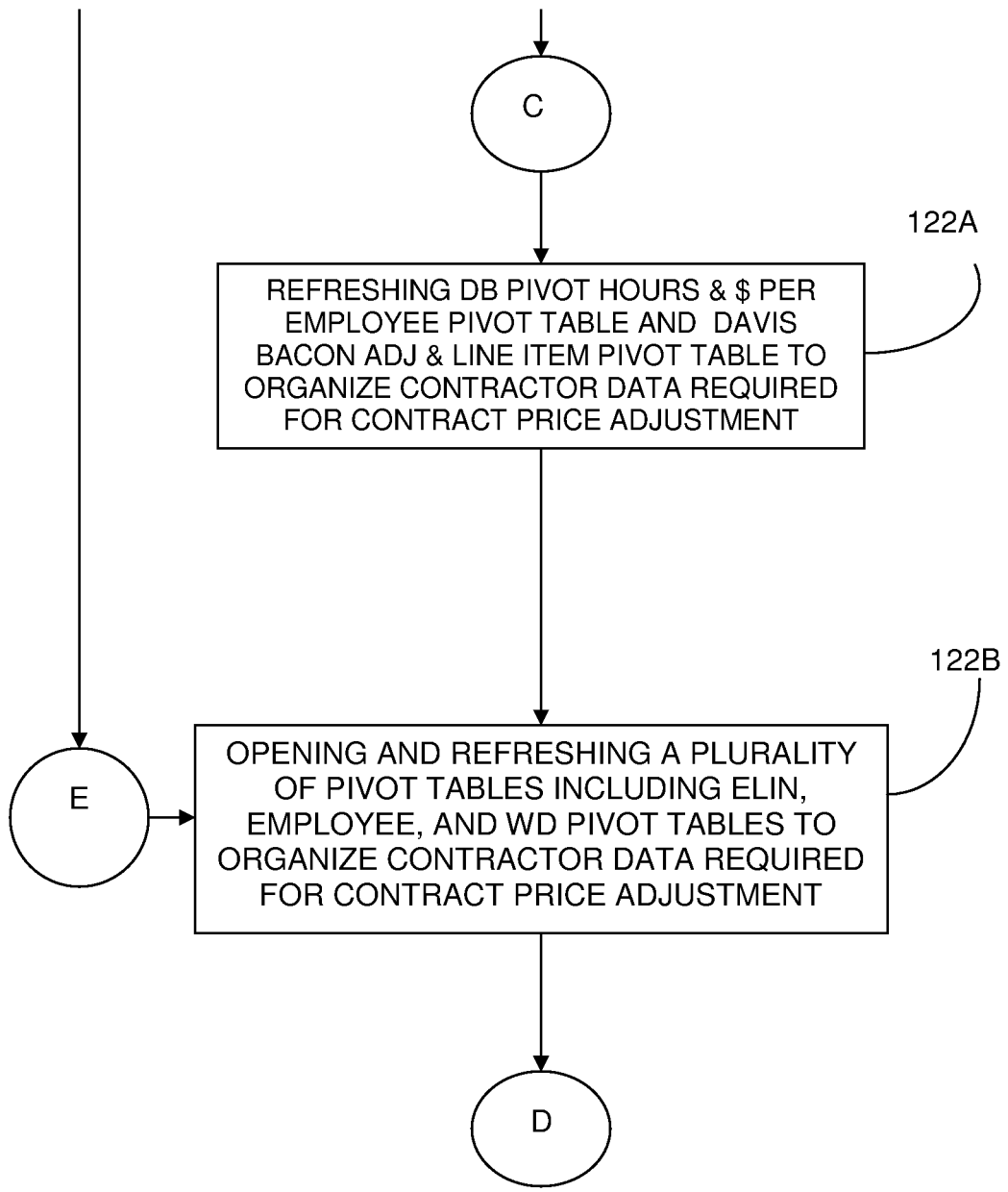
FIG. 1D further illustrates elements of the method of calculating, analyzing, determining compliance with FAR and CFR requirements, determining allowability, allocability and adjusting contract prices due to the impact of SERVICE CONTRACT ACT wage adjustment rules and regulations.

The operations of the method 100 are continued, as indicated by the continuation oval labeled as the letter C at the bottom of FIG. 1C and at the top of FIG. 1D.

Referring again to FIG. 1D and FIG. 1B, in accordance with the first exemplary embodiment, at an operation refreshing DB Pivot Hours & $ Per Employee Pivot Table and DAVIS BACON Adj & Line Item Pivot Table to Organize Contractor Data Required for Contract Price Adjustment 122A, (hereafter "the operation 122A") the program code of the method 100 executed by the computer processor 206, causes the computer processor 206 to automatically open each tab of the DB PIVOT HOURS & $ PER EMPLOYEE PIVOT TABLE and DAVIS BACON ADJ & LINE ITEM PIVOT TABLE and refresh data under these two tabs enabling the user/operator and/or contract specialist to organize contractor data required for contract price adjustment. This is where allocability analysis is performed for DBA hours, by the user, operator and/or contract specialist, after the program code of the method 100 organizes the data in a way that can be verified by grouping the data together in the important categories, when there are DAVIS BACON data in the price adjustment proposal from the contractor, as determined in the determining operation 114 above (see FIG. 1B).

Referring to FIG. 1B, FIG. 1C, FIG. 1D and FIG. 2, in accordance with the first exemplary embodiment, after performing the operation 122A, or after continuing from the NO result of the determining in the determining operation 114, the method 100 continues to an operation opening and refreshing a plurality of pivot tables including ELIN, Employee, and WD pivot tables to organize contractor data required for contract price adjustment 122B, (hereafter "the operation 122B"), the program code of the method 100 executed by the computer processor 206, causes the computer processor 206 to automatically open each tab of at least three pivot tables of a plurality of pivot tables and refresh data in the at least three pivot tables of the plurality of pivot tables, upon receiving, by the computer processor 206, a signal from the input device 252, actuated by the user/operator and/or the Government Contract Specialist. The at least three pivot tables of the plurality of pivot tables include the electronic line item pivot table summary, the employee pivot table summary and the WD pivot table summary (i.e., wage determination pivot table summary). These three pivot tables are routinely opened and the data they contain are refreshed with DAVIS BACON data routinely, when DAVIS BACON data are contained in the DB PIVOT HOURS & $ PER EMPLOYEE PIVOT TABLE and DAVIS BACON ADJ & LINE ITEM PIVOT TABLE. Also, these three pivot tables are opened and refreshed routinely, when the method 100 continues from the NO result of the determining operation 114. The plurality of pivot tables can include sets of pivot tables containing one or more of SCA calculation data, collective bargaining agreement (CBA) calculation data, as well as, DBA calculation data. The received signal indicates that the user/operator and/or the Government Contract Specialist has selected an icon or symbol (i.e., an icon or symbol designated by one or more colors, such as a red exclamation point) on a toolbar rendered on the user interface 204 containing a plurality of icons for data summarization and visualization. The selection of the icon corresponds with the opening of the pivot tables. The user, operator, and/or contract specialist, using the input device 252, designates/clicks into the line item pivot summary tab on the spreadsheet 205, to view what ever is in the spreadsheet 205 under the line item pivot summary tab for line items, including (in exemplary embodiments) annex/CLIN (contract line item number) and ELIN (electronic line item number)/sub-CLIN designators. In exemplary embodiments, similar and/or like tasks are usually grouped together by annex categories. In exemplary embodiments, subtotals are built into the line items of the line item pivot summary (which is where allocability analysis is performed for SCA hours, by the user, operator and/or contract specialist, after the program code of the method 100 organizes the data in a way that can be verified by grouping the data together in the important categories). Another name for a CLIN is an annex. An annex, also known as a CLIN, is a contractual term that is a broad categorical grouping used to organize work performed on a contract by specific functions of the work. An ELIN, also, known as a sub-CLIN, is therefore a more specific sub-grouping within the annex designation that further defines the type of work being performed on that annex of the contract. Within annex groupings, there are breakdowns of items such as security escorts and gate guards. Referring to FIG. 5, calculation data under the ELIN Pivot Summary screen of the spreadsheet 205, within annex 0200, which is overhead management, the ELIN O2EJB for the contractor is going to go up by $1730.90 which is composed of the increases for Snoop Dog, Will Smith, George Jones, Merle Haggard, Reba McIntyre, Willie Nelson, Michael Bolton and Miranda Lambert. You can see exactly where that increase of $1730.90 came from and how much is attributed to each person, whether they were working overtime and how many hours they clocked on the contract and who performed work for that line item of the contract and how much work for each individual and how much each worker contributed to the increase. In exemplary embodiments, contracting officers' representatives (CORs) are required to keep track of which customers use which line items of a given contract; thus a COR can determine that in a given contract ELIN 10AA has ten customers, but one of those ten customers uses twenty percent of a given ELIN and the others only use five percent of the given ELIN; this is an important funding aspect capability of the PACT.

Referring to FIG. 1D, in accordance with the first exemplary embodiment, pivot tables in the plurality of pivot tables include (but are not limited to): a line item pivot summary (where the line item pivot summary can also be referred to as the ELIN, i.e., electronic line item number pivot or the CLIN, i.e., the contract line item number pivot, or sub-CLIN), an employee pivot summary, a WD pivot summary, a most worked lab cats (i.e., category) rate pivot, a DB hours pivot & $ per employee, and a DAVIS BACON Adj & ELIN & ANNEX tab, (see FIG. 9A) (i.e., DAVIS BACON Adjustment & Line Item tab), which can also be referred to as the DB Adj & Line Item pivot table.

In exemplary embodiments, the most worked labor categories rate pivot data under the most worked lab cats rate pivot tab relates to raw data vacation which is obsolete because by virtue of the analysis performed by the SCA PACTp tool, this data is not allowable.

Referring again to FIG. 1D and the operation 122A and the operation 122B, clicking on the employee pivot summary tab in the spreadsheet 205, by the user, operator and/or the contract specialist, the method 100 causes the system 200 executing the method 100, to show on the display 202 what each individual employee is entitled to.

In exemplary embodiments, each cell can be highlighted and or designated. Employees may have negative hours recorded, so they have a negative adjustment. This should be looked at by the user, operator and/or contract specialist. Some employees may have both CBA and DBA hours; this also needs to be analyzed by the user, operator and/or contract specialist. Thus, these records can be verified against actual payroll data and (in regard to DAVIS BACON ACT data) may cause the user, operator and/or contract specialist to require weekly payroll data and/or information from the contractor. Instructions in the designated text box, i.e., designated by a blue or a highlighted text box, prompt the user, operator and/or contract specialist to check various values.

In exemplary embodiments, when the user, operator and/or contract specialist clicks on the WD pivot summary tab of the spreadsheet 205, the user, operator and/or contract specialist can view data that has been segregated, subtotaled and organized by the method 100, in regard to which wage determinations govern a wage rate, based on locality and/or jurisdiction. Conceptually, a worker can be performing the same job on five different wage determination regulations and thus, have to be paid at five different wage rates. After these above operation are completed, the operations of the method 100 continue through the oval labeled D to the operation of providing tips on each worksheet to facilitate determining allowability, allocability and compliance with FAR and SCA clauses.

Referring again to FIG. 1D and the operations 122A and/or 122B, when the raw data for DAVIS BACON ACT information has already been pasted and populated under the DAVIS BACON breakout tab and other tabs (see FIG. 9A), the populated data is ready for analysis. The user, operator and/or contract specialist then clicks on the DB Pivot Hours & $ Per Employee tab (see FIG. 9A). In exemplary embodiments, this tab can be colorized with various colors including green, blue, red, yellow or any combination of colors. The program code of the method 100 can cause this tab to also be highlighted and/or shaded. After clicking into the DB Pivot Hours & $ Per Employee tab, the user, operator and/or contract specialist transmits a signal to the system 200 causing the method 100 to refresh data in the DB Pivot Hours & $ Per Employee sheet of the spreadsheet 205 (see FIG. 9A).

Further, in the operation 122A, the method 100 executed by the computer processor 206, causes the computer processor 206 to automatically organize, using conditionally formatted cells, contractor data so that records requiring analysis by the user, operator and/or contract specialist stand out and are easily identified. These data can be highlighted, or caused to flash or be colorized. Thus, the user, operator and/or contract specialist can select and/or gather specific records required from the contractor seeking contract price adjustment, where the specific records targeted are selected based on the analysis and interpretation of the Government Contract Specialist. Or, the selected records can be targeted manually by the user or operator or Government Contract Specialist, who can send a signal to the system 200 requesting that the contractor submit one or more records from a plurality of records held by the contractor. These records are used by the user/operator and/or Government Contract Specialist to verify data integrity of the contractor's contract price adjustment proposal.

Again referring to FIG. 1B and FIG. 1D, when it is determined in the determining operation 114 that the price adjustment proposal from the contractor does not contain DAVIS BACON act hours, then the method 100 continues directly to the operation 122B from the NO determination result of the determining operation 114, where, in accordance with the first exemplary embodiment, at the operation 122B, the program code of the method 100 executed by the computer processor 206, causes the computer processor 206 to automatically open and refresh the electronic line item pivot table summary, the employee pivot table summary and the WD pivot table summary, as discussed above, these three pivot tables are routinely opened and the data they contain are refreshed with DAVIS BACON data routinely, when DAVIS BACON data are contained in the DB PIVOT HOURS & $ PER EMPLOYEE PIVOT TABLE and DAVIS BACON ADJ & LINE ITEM PIVOT TABLE.

Figure 1E:
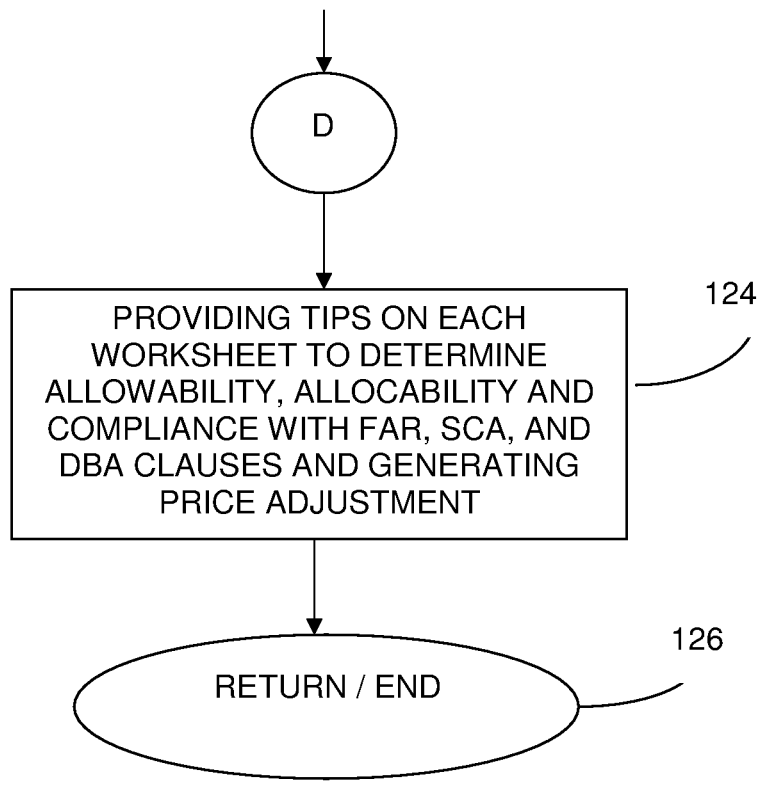
FIG. 1E illustrates additional elements of the method of calculating, analyzing, determining compliance with FAR and CFR requirements, determining allowability, allocability and adjusting contract prices due to the impact of SERVICE CONTRACT ACT wage adjustment rules and regulations.

After completing operations 122A and/or 122B, the operations of the method 100 continue to providing tips, as indicated by the oval labeled D at the bottom of FIG. 1E and continued at the top of FIG. 1D.

Referring to FIG. 1D, FIG. 1E and FIG. 2, in accordance with the first exemplary embodiment, at the operation of providing tips on each worksheet to determine allowability, allocability and compliance with FAR, SCA, and DBA clauses 124 (hereafter "the operation 124"), the program code of the method 100 executed by the computer processor 206, causes the computer processor 206 to automatically display tips in text boxes on the display 202. These text boxes containing tips can programmatically (i.e., in the method 100) be highlighted, or caused to flash or be colorized. Thus, the user/operator and/or contract specialist can select and/or gather specific information and hints about the organized contractor records selected by the method 100, so the user/operator and/or contract specialist can determine allowability, allocability and compliance with FAR, SCA, and DBA clauses of the contractor's contract price adjustment proposal. After determining allowability, allocability and compliance of the total contract price adjustment, based on the information from the contractor and visually highlighting inconsistent information and organizing information by the method 100 in a manner that clearly shows flaws in the data contained in the contractor's supplied information and then after formatting, by the method 100, cells in the spreadsheet 205 that signaled potentially invalid data, the operator and/or contract specialist initiates a signal or series of signals transmitted by the input device 252, and when received by the computer processor 206, causes the computer processor 206 to automatically and/or programmatically, in executing the method 100, generate either a contract modification for the price adjustment, if there is no prospective invalid data, or generate a request to the contractor (either through e-mail, facsimile, telephone or any other mode of professional communication over a communications network, such as, the network 272; thus, generating and disseminating useful information by transforming the initial raw data submitted by the contractor into the allowable, allocable and compliant total contract price adjustment, that the contractor is eligible to receive, based on the operations performed by the method 100.

In exemplary embodiments, compliance relates to compliance with SERVICE CONTRACT ACT clauses in the Federal Acquisition Regulations. The user, operator and/or contract specialist is not tasked to determine whether the contractor is in compliance with all labor laws. This is a cross checking mechanism. The WD pivot summary helps the user, operator and/or contract specialist know where and/or when to validate whether the contractor got the correct wage rate adjustment.

Referring to FIG. 1A, FIG. 1B, FIG. 1C and FIG. 2, in accordance with the first exemplary embodiment, at an operation return/end 126, (hereafter "the operation 126"), the program code of the method 100 executed by the computer processor 206, causes the computer processor 206 to automatically either return to any of the above operations and iteratively perform any one or more of the operations until the appropriate contract price adjustments are completed. Or, the program code of the method 100 executed by the computer processor 206, causes the computer processor 206 to end, either when the operations are completed or when the program code of the method 100 receives a signal to stop.

Figure 4:
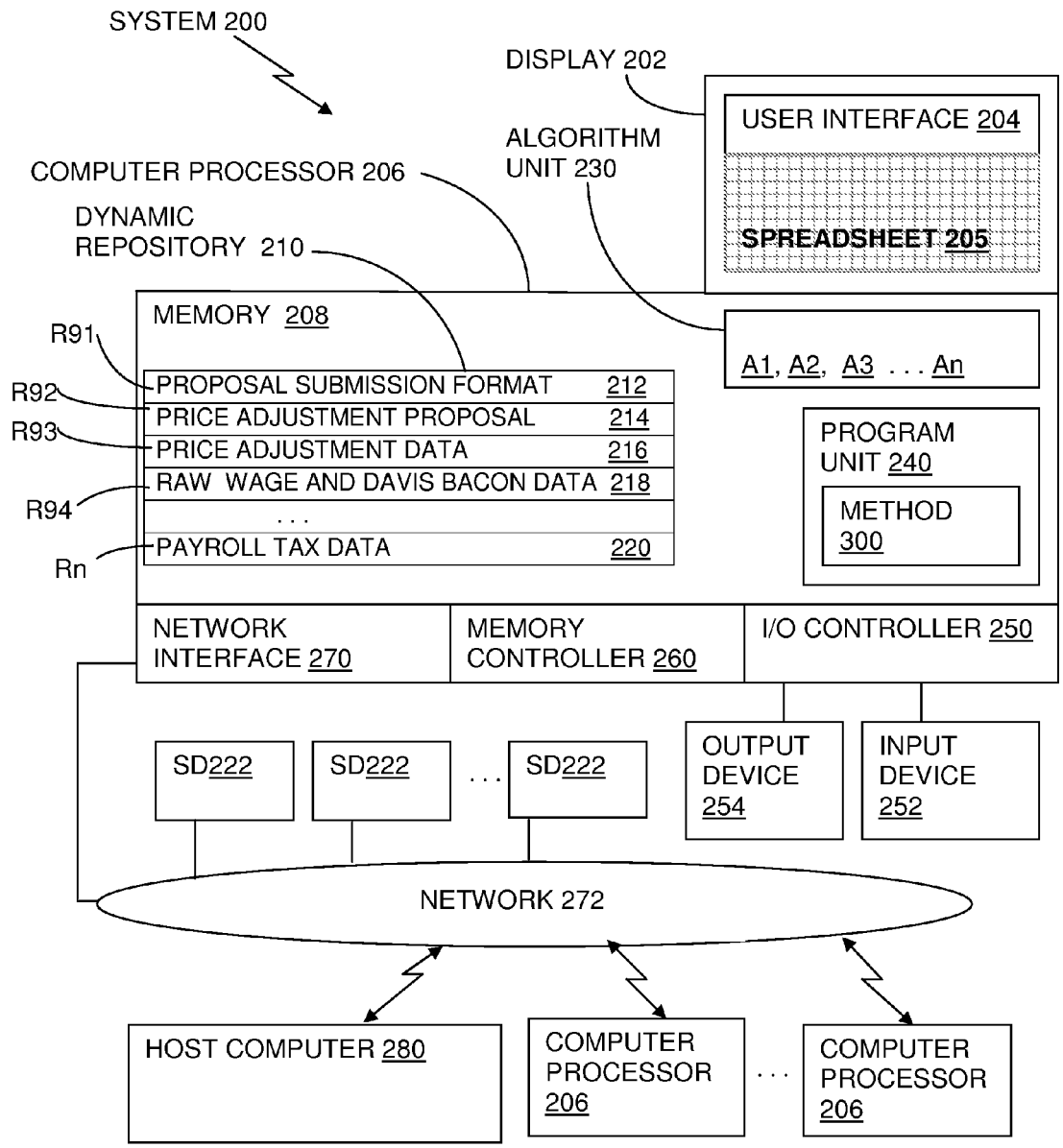
FIG. 4 illustrates a system implementing the method illustrated in FIG. 3A and FIG. 3B.

In a second exemplary embodiment, referring to FIG. 3A, FIG. 3B and FIG. 4, there is no filtering of any governing wage determination column for DAVIS BACON ACT information on a raw data wage health and welfare tab of the SCA PACTp tool. Instead of filtering operations, the same result from the method 100 of calculating is achieved in the method 300, implemented on the system 200, by the performance of an other (i.e., a different) version of "if/then" logic built into an other formula or other formulas and/or algorithm(s) in a Total Adjustment Entitlement column, as described in the method 300. Thus, the method 300 is programmed with a different "if/then" logic than the "if/then" logic programmed in the method 100. In the second exemplary embodiment, several formulas executed in the first embodiment (i.e., the method 100 embodiment) are programmatically combined together in the method 300, so that the method 300 does not require copying, pasting and filtering of information, which is required in the method 100. The formulas combined in the method 300 include:

$$=\text{IF}(E11\text{=``DBA''},\text{``see DB Breakout sheet''},(((H11-G11)+(J11-I11))*K11)+\text{SUM}(M11:O11)). \quad (4);$$

$$(((H11-G11)+(J11-I11))*K11)+\text{SUM}(M11:O11)).$$
(NOTE: SUM($M11:O11$) is the same as SUM ($M11+N11+O11$). (5); and $$\text{IF}((G11+I11)\text{>=}(H11+J11),O,(H11+J11)-(G11+I11)). \quad (6).$$

Further, these formulas, i.e., (4), (5) and (6) combined together programmatically form a new formula, herein represented as formula (8):

$$\text{If}(E11\text{=``DBA''},(\text{IF}((G11+I11)\text{>=}(H11+J11),O,(((H11+J11)-(G11+I11))*K11)+(\text{SUM}(M11:O11)))),\text{IF}(L11\text{>}1,((H11-G11)*K11)+\text{SUM}(M11:O11),\text{IF}(L11+1,((H11-G11)+(J11-I11))*K11)+\text{SUM}(M11:O11))). \quad (8).$$

Referring to FIG. 3A, FIG. 3B and FIG. 4, in accordance with the second exemplary embodiment, at an operation start 302 (hereafter "the operation 302"), the system 200 receives a signal from a user, an operator and/or a contract specialist via either the input device 252 or an automatic programmatic wake up signal from the computer processor 206 which activates and initiates the computer executable program code implementing the method 300 which provides various solutions to price adjustment related problems, including mathematical calculations, analyses and determinations of economic factors regarding contract price adjustments for at least multi year or multiple option year contracts.

Referring again to FIG. 3A, and FIG. 4, in accordance with the second exemplary embodiment, at an operation receiving request for contract price adjustment 304 (hereafter "the operation 304"), the program code of the method 300 executed by the computer processor 206 of the system 200 causes the computer processor 206 to receive an initiation request, such as a request made by a contractor requesting a contract price adjustment. The request can be a verbal, an electronic or a hardcopy paper request.

Referring to FIG. 3A, and FIG. 4, in accordance with the second exemplary embodiment, at an operation providing submission format for price adjustment proposal 306 (hereafter "the operation 306"), in response to the contractor's request for price adjustment, the computer processor 206 automatically transmits to the contractor and/or the contractor's computer system over the network 272 a submission format for a price adjustment proposal. The submission format includes submission formats which accommodate odd number wage determinations or even numbered wage determinations or collective bargaining agreement proposal submissions.

Referring to FIG. 3A, and FIG. 4, in accordance with the second exemplary embodiment, at an operation receiving and storing price adjustment proposal in spreadsheet format 308 (hereafter "the operation 308"), the computer processor 206 receives a price adjustment proposal transmitted by the contractor in a spreadsheet format, which is subsequently stored on a computer executable and computer readable medium. The price adjustment proposal transmitted by the contractor in the spreadsheet format can be sent from the contractor's computer system and transmitted over the network 272, where it is received by the computer processor 206. In exemplary embodiments, the contractor is required to distinguish DAVIS BACON ACT hours in his/her request and/or proposal.

Referring to FIG. 3A, and FIG. 4, in accordance with the second exemplary embodiment, at an operation copying a plurality of data from the price adjustment proposal 310 (hereafter "the operation 310"), the computer processor 206 automatically copies, to a temporary storage repository, such as the dynamic repository 210 or a clipboard, a plurality of data from the price adjustment proposal transmitted by the contractor, such as the price adjustment data 216 held in repository entry location R93. In exemplary embodiments, after receiving a prompt from the computer processor 206 on the display 202, the user and/or operator or the contract specialist can manually copy, using the input device 252 in conjunction with the user interface 204, the plurality of data from the price adjustment proposal, such as the price adjustment data 216, transmitted by the contractor into a temporary repository, such as the repository entry location R93 of the dynamic repository 210 or the clipboard.

Referring to FIG. 3A, FIG. 3B and FIG. 4, in accordance with the second exemplary embodiment, at an operation pasting the plurality of data from the price adjustment proposal into reception format 312 (hereafter "the operation 312"), the computer processor 206 automatically pastes, to a temporary storage repository, such as the dynamic repository 210 or a clipboard, a plurality of data from the price adjustment proposal transmitted by the contractor, such as the price adjustment data 216. In exemplary embodiments, the user and/or operator or the contract specialist can manually paste into a corresponding proper reception format (where the proper reception format includes odd numbered wage determinations or even numbered wage determinations or collective bargaining agreement determinations) the plurality of data from the price adjustment proposal, such as the price adjustment data 216, transmitted by the contractor. The plurality of data includes the data which were copied into the temporary storage repository, such as the price adjustment data 216. The pasting can be accomplished by the user or operator or contract specialist using the input device 252 in conjunction with the user interface 204. Thus, the proposal submission data is copied into the raw data wage health and welfare sheet of the spreadsheet 205. The operations of the method 300 are continued, as indicated by the continuation oval labeled as the letter A at the bottom of FIG. 3A and at the top of FIG. 3B.

Referring to FIG. 3B, FIG. 4, FIG. 9A and FIG. 9B, in accordance with the second exemplary embodiment, at an operation designating calculate totals for raw data wage, health and welfare 314 (hereafter "the operation 314"), the computer processor 206 automatically designates one or more buttons (such as the calculate totals button 902), or icons or tabs on the user interface 204. The designated buttons include a calculate totals button 902, for a tab representing raw data wage health and welfare information in a data repository, such as the dynamic repository 210, for storing raw data and a calculate totals button 902 for a tab representing DAVIS BACON ACT breakout information in a data repository for storing DAVIS BACON ACT breakout information in a menu/template of a graphical user interface (see FIG. 9A), such as the user interface 204 (see FIG. 4). In exemplary embodiments, the designating of the buttons, such as the calculate totals button 902, includes highlighting, shading, colorizing and/or enlarging the size or flashing the buttons on the user interface 204, in accordance with the method 300 implemented in the system 200 as the SCA PACTp. Referring again to FIG. 3B, and FIG. 4, and the determining operation 114, when the method 300 determines that the price adjustment proposal submitted by the contractor either contains or does not contain DAVIS BACON ACT hours, then the method 300 continues with calculation operations.

Referring to FIG. 3A, FIG. 3B, and FIG. 4, in accordance with the second exemplary embodiment, at the operation 314, the program code of the method 300 executed by the computer processor 206, causes the computer processor 206 to automatically determine either whether the price adjustment proposal submitted by the contractor contains DAVIS BACON ACT hours or whether the price adjustment proposal submitted by the contractor does not contain DAVIS BACON ACT hours. The contractor distinguishes DAVIS BACON ACT hours from SERVICE CONTRACT ACT hours in the contractor's submitted proposal and/or request. When the method 300, executed by the computer processor 206, determines that the price adjustment proposal submitted by the contractor contains DAVIS BACON ACT hours, then the method 300 causes the computer processor 206 to automatically capture the DAVIS BACON ACT hours information from a total adjustment entitlement column and to call a correct DAVIS BACON ACT algorithm from the algorithm unit 230, and wherein the computer processor 206 performs a designating operation by designating calculate totals button (s) 902 for one or more of either SCA data wage information and/or DAVIS BACON ACT information. Thus, the correct DAVIS BACON ACT algorithm is applied to derive and/or make an appropriate wage determination, when the governing wage determination column reflects DAVIS BACON ACT hourly information.

Referring to FIG. 3B, and FIG. 4, in accordance with the second exemplary embodiment, at the operation 314, the computer processor 206 automatically calls a correct algorithm from the algorithm unit 230, where the correct algorithm in this case is an algorithm programmed (i.e., programmed into the method 300) and/or constructed to capture any DAVIS BACON ACT hours information and/or data and stores such data either permanently, semi-permanently or temporarily in an available repository entry location in the dynamic repository 210 for further use by the computer processor 206 and the method 300 in performing the operations of the method 300. Further, in the second exemplary embodiment, another species of the correct algorithm can be an algorithm applying a formula to capture a DAVIS BACON ACT wage determination number, either instead of and/or along with the DAVIS BACON ACT hours information and apply the formula to the governing wage determination column that reflects the DAVIS BACON ACT number. Further, in the second exemplary embodiment, another species of the correct algorithm can be an algorithm that automatically updates wage determination rates, by online, real time network connectivity with organizations and/or agencies providing wage rate updates. In exemplary embodiments, a Governmental organization, or instrumentality and/or agency can be an agency such as the United States Department of Labor or the United States Navy. See the United States Department of Labor website WDOL.GOV for an example of such a governmental organization, instrumentality and/or agency website. In exemplary embodiments, the SCA PACTp tool is available and downloadable on line in real time by a user, operator and/or contract specialist, from such a governmental organization and/or agency. Upon download, the newest/latest wage determination rates are populated, this can be based on a wage determination number.

Referring to FIG. 3A, FIG. 3B, FIG. 4, FIG. 9A and FIG. 9B, in accordance with the second exemplary embodiment, at an operation receiving a signal activating calculate totals to populate repository fields with calculated payroll taxes and adjustment entitlements and visually highlighting inconsistent data 316, (hereafter "the operation 316"), the computer processor 206, upon receipt of a programmatic or manual signal from the input device 252, automatically activates the designated calculate totals button 902 for raw data wage and DAVIS BACON ACT information calculations and transform contractor raw data into the allowable, allocable and compliant total contract price adjustment data. And, formula (8) is called by the program code of the method 300 and executed on the computer processor 206 to perform these calculations.

Referring again to FIG. 3B, FIG. 9A and FIG. 9B at the operation 316, in accordance with the second exemplary embodiment, upon activation of the calculate totals button 902, a string of visual basic code is run to apply formulas for payroll taxes and adjustment entitlement to each line of data in spreadsheet 205.

Further, referring to FIG. 3B, FIG. 4 and FIG. 9B, in accordance with the second exemplary embodiment, at the operation 316, based on the execution of the formula (8), the computer processor 206 automatically calculates payroll taxes and price adjustment entitlements, based on the activation of the calculate totals button 902 for information found under the Raw Data Wage and H&W worksheet tab 904.

Referring to FIG. 3B, FIG. 3C, and FIG. 4, in accordance with the second exemplary embodiment, formula (8) is applied to the aggregate SCA and/or DBA data provided by the contractor and managed in the SCA PACTp tool. Because the aggregate data submitted by any given contractors is submitted in a uniform manner via a required submission format (see the operations 306 and 308), formula (8) can be applied by the method 300 uniformly and consistently to any such contractor's submitted aggregate data; in addition the required submission format allows the contractor to make distinctions to the aggregate data submitted by the contractor. Formula (8) combines and condenses information from thirty-eight pages of the Department of the Navy DESK GUIDE FOR SERVICE CONTRACT PRICE ADJUSTMENTS SERVICE CONTRACT ACT AND FAIR LABOR STANDARDS ACT, JANUARY 2007 (hereafter "the DESK GUIDE"), as well as information from the FAR and DFARS. According to the second exemplary embodiment (as well as the first exemplary embodiment), portions of the formula (8) represent certain algorithmic expressions interpreted and developed from analysis of and from an understanding of the policies from sections of the DESK GUIDE, based on practice experience, concerning practice details not described in the DESK GUIDE or the FAR or the DFARS, which could only be discovered and/or determined by analysis of best practices conducted, performed and reduced to practice as disclosed herein, by the inventor, for the method 100 and the method 300, respectively, such as, in regard to the method 300, expressed as, If(L11>1, ((H11−G11)*K11), which represents section 4.6 of the DESK GUIDE (i.e., a Wage Determination in the Wage Adjustment Computation). Also, according to the second exemplary embodiment, the portion of the formula (8) written as the expression +SUM(M11:O11) further represents algorithmic expressions interpreted from section 4.6 of the DESK GUIDE (i.e., the specified allowable payroll taxes and workers compensation insurance costs applicable to the Wage Adjustment Computation).

In accordance with exemplary embodiments, portions of the formula (8) are derived from interpretation of the CFR and not the DESK GUIDE. Further, in accordance with the exemplary embodiments, the CFR and not the DESK GUIDE requires that health and welfare increases shall be applied to overtime hours to an odd wage determination. Thus, in the second exemplary embodiment, the formula (8) also includes and/or is combined with algorithmic expressions interpreted from the FAR and the CFR relating to wage adjustment computations. The CFR goes into a much deeper explanation of wage determination nuances involved in applying the requirements outlined in the FAR and the DESK GUIDE. Wage determination requirements are subject to change and are updated in the form of updated wage determination laws codified in the FAR and the CFR, as well as delineated in the DESK GUIDE; however, nuances of these wage determination requirements have not been captured, interpreted and applied simultaneously in a connected, combined, automated application of law (in particular contract law) reduced to the form of mathematically interpreted requirements, and/or algorithmic expressions, such as the formula (8), and based on a required submissions format from contractors. According to exemplary embodiments, the nuances of wage determination requirements have to be applied, uniformly, in the correct order and across an immense amount of complex data.

The formula (8), as used in the second exemplary embodiment, obviates the need to filter data, and then copy and paste any filtered data into spreadsheets such as the spreadsheet 205; thus, reducing introduction of errors in the contract price adjustment calculations. Furthermore, some of the tabs relied on in the spreadsheet 205 of the first exemplary embodiment can be eliminated in the second exemplary embodiment.

In exemplary embodiments, different versions and/or iterations of the formula (8) shall include odd and/or (verses) even wage determination implementations, as well as, implementations for collective bargaining agreements and other subtle nuances of odd and even wage determination applications delineated in the CFR. A species of the SCA PACTp tool can determine if a wage determination number has been submitted by a contractor and whether the number is odd or even and then a correct formula for total adjustment entitlement can be applied.

A species of the second exemplary embodiment employs an algorithmic expression incentivizing the Government (see FIG. 14) by providing savings to the Government in dollars (i.e., price adjustment savings and Government employee salaries) and savings from using excess person hours and provides a potential for collection revenues for appropriate funds, fees and/or penalties.

Another species of the second exemplary embodiment implements savings to the contractor(s) in regard to savings in person hours, in regard to determining the appropriate proposed adjustment amounts, as well as savings from potential fines or penalties incurred for non-compliance with CBA, SCA or DBA requirements, or non-compliance with Department of Labor regulations.

Another species of the second exemplary embodiment implements benefits to workers, by determining and/or verifying which workers are eligible to receive the correct wages and fringe benefits.

Another species of the second exemplary embodiment implements a method of enabling contractors to use the SCA PACTp tool by obtaining a license to use the tool.

Again referring to FIG. 3B, FIG. 4, FIG. 9A and FIG. 9B, in accordance with the second exemplary embodiment, at the operation 316, the computer processor 206 automatically fills down (i.e., populates) data fields of the spreadsheet 205 with data/values for payroll taxes and appropriate adjustment entitlements using applicable SERVICE CONTRACT ACT and/or DAVIS BACON ACT federal acquisition regulation requirements. The method 300 cause the computer processor 206 to populate the calculation results from the executed formula (8); thus, causing populating of calculated values of DAVIS BACON ACT data into every related cell, i.e., of the same total adjustment entitlement column, as it populates the correct values for the SERVICE CONTRACT ACT employees and populates that data in the total adjustment entitlement column in the spreadsheet 205. The method 300 programmatically uses applicable SERVICE CONTRACT ACT and/or DAVIS BACON ACT federal acquisition regulation requirements, as implemented in the program represented by the formula (8), to determine which data fields of the spreadsheet 205 are populated and to determine which data elements are appropriate data elements for data summarization and visualization in a plurality of pivot tables, within the spreadsheet 205 associated and/or managed and/or manipulated by the user interface 204, displayed on the display 202.

Referring to FIG. 3B, FIG. 4 and FIG. 9B, in accordance with the second exemplary embodiment, at an operation opening and refreshing a plurality of pivot tables to organize contractor data required for contract price adjustment 318, (hereafter "the operation 318"), the computer processor 206 receives a signal from the user, operator, and/or contract specialist, directing the computer processor 206 to automatically open each tab of a plurality of tabs in the spreadsheet 205 containing a blank pivot table and refreshes data in the plurality of pivot tables, upon receiving a signal from the input device 252, actuated by the user/operator and/or the Government Contract Specialist. The received signal indicates that the user/operator and/or the Government Contract Specialist has selected an icon or symbol (i.e., an icon or symbol designated by one or more colors, such as a red exclamation point) on a toolbar (from a plurality of toolbars containing a plurality of icons) rendered on the user interface 204 containing a plurality of icons for data summarization and visualization. The selection of the icon by the user, operator, and/or contract specialist corresponds to opening of the pivot tables and causes the program code of the method 300 to be further executed by the system 200 and causes the system 200 to provide data summarization and visualization in the plurality of pivot tables. The execution of the formula (8), by the computer processor 206, as implemented in the second exemplary embodiment eliminates the DAVIS BACON Breakout Raw Data Worksheet 901 and eliminates segregating DAVIS BACON ACT employee data from SERVICE CONTRACT ACT employee data. Another feature of the implementation of the second exemplary embodiment is that DAVIS BACON ACT employee data, SERVICE CONTRACT ACT employee data, and COLLECTIVE BARGAINING employee data are all displayed and can be viewed in one line item pivot table/summary, instead of having to have a separate line item pivot summary for DAVIS BACON ACT employee data and a separate line item pivot summary for SERVICE CONTRACT ACT employee data.

Referring to FIG. 3B and FIG. 4, in accordance with the second exemplary embodiment, at the operation 316, the computer processor 206 automatically analyzes the results of the series of calculations, and upon receiving a signal activating calculate totals, the computer processor 206 populates repository fields with calculated payroll taxes and adjustment entitlements in regard to payroll taxes and analyzes the determined price adjustment entitlements for inconsistent data, and visually highlights inconsistent data on the user interface 204, to facilitate further determination, by the user/operator and/or contract specialist of appropriate price adjustment entitlements.

Referring to FIG. 3B and FIG. 4, in accordance with the second exemplary embodiment, at the operation 318, the computer processor 206 automatically organizes the results of the series of calculations, in regard to payroll taxes and price adjustment entitlements, to facilitate further determination of appropriate price adjustment entitlements. Organizing includes selecting and/or gathering and/or identifying and/or highlighting specific records required from the contractor seeking contract price adjustment. Or, the records can be targeted manually by the user or operator or Government Contract Specialist, who can send a signal via an input device, such as the input device 252, to the system 200 requesting that the contractor submit one or more records from a plurality of records held by the contractor. These records are used by the user/operator and/or contract specialist to verify data integrity of the contractor's contract price adjustment proposal.

Referring again to FIG. 3B and FIG. 4, in accordance with the second exemplary embodiment, at the operation 318, the computer processor 206 automatically generates a contract price adjustment amount, based on calculation operations performed by the method 300, to be transmitted, as the contract modification amount, either electronically or via hardcopy paper to the contractor. The award amount may be an increased amount or a decreased amount or no amount, in regard to the proposal submitted by the contractor.

Referring to FIG. 3C, FIG. 4 and FIG. 5, in accordance with the second exemplary embodiment, at an operation providing tips on each worksheet to determine allowability, allocability and compliance 320, (hereafter "the operation 320"), the computer processor 206 automatically provides helpful tips and/or hints in text boxes in designated areas, such as areas highlighted/activated or areas indicated by one or more colors, such as blue boxes positioned in each worksheet of a plurality of worksheets of the spreadsheet 205 used by the Government Contract Specialist or user/operator to understand and determine allowability and compliance verification of the request/proposal made by the contractor seeking contract price adjustment. After determining allowability, allocability and compliance of the total contract price adjustment, based on the information from the contractor and highlighting inconsistent information and organizing information by the method 300 in a manner that shows flaws clearly in the contractor's supplied information and then formatting by the method 300 cells in the spreadsheet 205 that signaled invalid data, the user/operator and/or contract specialist initiates a signal from the input device 252. Upon receipt by the computer processor 206, the signal initiated by the user/operator and/or contract specialist, causes the computer processor 206 to automatically generate either an allowable and allocable contract price adjustment or generate a request that the contractor provide additional information. In addition, the signal received by the computer processor 206 further causes the computer processor 206 to transmit the generated allowable and allocable contract price adjustment and/or the request for additional information to the contractor over a communications network, such as the network 272; thus, transforming the initial raw data submitted by the contractor into the allowable, allocable and compliant total contract price adjustment, that the contractor is eligible to receive, based on the operations performed by the method 300. Thus, the contractor can receive a contract modification dollar amount.

In the second exemplary embodiment, referring to FIG. 5, a contracting officer's representative (COR) can get a full snapshot of how much the COR needs to assess each customer for certain employee labor hours data from one sheet of the spreadsheet 205. The COR can split out amounts for charging end user customers of a given contract for work performed under the contract. The second exemplary embodiment can be integrated with a NATIONAL FACILITIES DATA SYSTEM. Thus, the implementation of the second exemplary embodiment eliminates having to view by the user, operator and/or contract specialist the line item pivot table summary for SERVICE CONTRACT ACT employees and eliminates having to also view the line item pivot table summary for DAVIS BACON ACT employees and eliminates having to add all of the information from the pivot table summary for DAVIS BACON ACT employee information to get the full snapshot of how much needs to be collected from each customer. The same economy of effort in savings is realized for payroll, because in the second exemplary embodiment data are organized so that the user, operator and/or contract specialist does not have to add the SERVICE CONTRACT ACT data with the DAVIS BACON ACT data. The implementation of the second exemplary embodiment makes it easy for the user, operator, and/or contract specialist to determine if a contractor is switching back and forth between DAVIS BACON ACT and SERVICE CONTRACT ACT labor categories and thus, implementation of the second exemplary embodiment makes it easy for the user, operator, and/or contract specialist to determine that the contractor may not be using the appropriate adjustment entitlement. DAVIS BACON ACT wages and fringe benefits are only to be paid for construction contracts, while SERVICE CONTRACT ACT wages and benefits are only to be paid to service contract employees. Note, DAVIS BACON ACT wage and fringe rates are usually much higher than SERVICE CONTRACT ACT wages and fringe benefit rates. Thus, with the implementation of the SCA PACTp tool, the user, operator, and/or contract specialist can easily and quickly see that the appropriate wages and health and welfare rates are being paid by the contractor. Furthermore, a COR or user, or operator and/or contract specialist can tell the purchasing customer using the contract, just how much and what the increase is for, i.e., where the working efforts are allocated. Thus, an important feature of the exemplary embodiments is that the format in which the raw data is received, combined with the formulas of the exemplary embodiments make the resulting data allocable.

Referring to FIG. 3B, FIG. 4 and FIG. 5, in accordance with the second exemplary embodiment, the summary in the line item pivot summary illustrated in FIG. 5 shows how the program code of the method 300 organizes and subtotals the adjustment first by annex (contract line item or CLIN) and further by ELIN (i.e., SUBCLIN) to ascertain allocability and therefore funding sources for applicable contract price increases.

Referring to FIG. 6, in accordance with exemplary embodiments, FIG. 6 illustrates a screen shot of an employee pivot summary in a spreadsheet. This employee pivot summary, in table format, organizes and visually segregates the contractor proposal by employee. The purpose of the representation of the data in FIG. 6 is to enable the user/operator and/or the contract specialist to see which specific employees may require further validation of payroll accuracy.

Referring to FIG. 7, in accordance with exemplary embodiments, FIG. 7 represents a pivot table that enables the Government Contracts Specialist to check that appropriate wage rates are being applied by organizing the data grouped under the governing wage tab. In cases where there are multiple or many wage determinations on the same contract, this becomes important in ensuring accuracy.

Referring to FIG. 10, in accordance with the exemplary embodiments, FIG. 10 represents a screen shot of a DAVIS BACON pivot hours & dollars per employee pivot summary. The methods of the exemplary embodiments, cause this sheet to calculates total adjustment entitlement for all records that apply to DAVIS BACON regular hours. This serves the same purpose as the employee pivot summary only for the DAVIS BACON subset of the records.

Referring to FIG. 11, in accordance with the exemplary embodiments, FIG. 11 represents a screen shot of a DAVIS BACON act adjustment and line item pivot summary. This screen serves the same purpose as the line item pivot summary, but only for the DAVIS BACON subset of the records.

Referring to FIG. 3A, FIG. 3B and FIG. 4, in accordance with the second exemplary embodiment, at an operation return/end 322, (hereafter "the operation 322"), the program code of the method 300 executed by the computer processor 206, causes the computer processor 206 to automatically either return to any of the above operations 304 through 320 and iteratively perform any one or more of the operations until the appropriate contract price adjustments are completed. Or, the program code of the method 300 executed by the computer processor 206, causes the computer processor 206 to end, either when the operations are completed or when the program code of the method 300 receives a signal from the user causing the operations to stop.

While the exemplary embodiments have been particularly shown and described with reference to preferred embodiments thereof, it will be understood by those skilled in the art that the preferred embodiments including the first exemplary embodiment, and the second exemplary embodiment have been presented by way of example only, and not limitation; furthermore, various changes in form and details can be made therein without departing from the spirit and scope of the invention. Thus, the breadth and scope of the present exemplary embodiments should not be limited by any of the above described preferred exemplary embodiments, but should be defined only in accordance with the following claim and/or claims and their equivalents. All references cited herein are each entirely incorporated by reference herein, including all data, tables, figures, and text presented in the cited references. Also, it is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art. The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein.

What is claimed is:

1. A method, implemented in a computer readable and executable program on a computer processor, determining contract price adjustments and screening for allowability and allocability of proposed adjustment entitlements, wherein the computer processor resides in a special purpose computer consisting of a PDA, a personal computer, a workstation computer, a minicomputer, and a mainframe computer, the method comprising:

receiving, by the computer processor residing in the special purpose computer consisting of the PDA, the personal computer, the workstation computer, the minicomputer, and the mainframe computer, a request made by a contractor for contract price adjustment;

providing, automatically by the computer processor residing in the special purpose computer, to the contractor, a submission format for a contract price adjustment proposal and receiving the contract price adjustment proposal in the submission format from the contractor, wherein the submission format for the contract price adjustment proposal includes an electronic spreadsheet having a plurality of raw electronic data submitted by the contractor requesting contract price adjustments, wherein the plurality of raw data along with and included in the electronic spreadsheet are downloaded programmatically over a network where they are received by the computer processor residing in the special purpose computer, wherein the submission format further includes blank electronic spreadsheet templates programmed to accommodate odd number wage determinations or even numbered wage determinations or collective bargaining agreements proposal submission formats, and wherein, the submission format templates further include instructions in word processing format for the contractor to distinguish DAVIS BACON ACT hours from SERVICE CONTRACT ACT hours;

calculating automatically, total adjustment to payroll tax adjustment entitlement and total adjustment to workers compensation adjustment entitlement, wherein payroll tax adjustment entitlement together with workers compensation adjustment entitlement are elements of accompanying cost adjustment entitlement and total wage and fringe benefit adjustment entitlement, by the computer processor executing the computer readable and executable program, wherein total wage and fringe benefit adjustment entitlement is selected from a group of adjustment entitlements consisting of wage adjustment entitlement amount plus fringe benefit adjustment entitlement amount and wage adjustment entitlement amount added to fringe benefit adjustment entitlement amount separately calculated, and both wage adjustment entitlement amount plus fringe benefit adjustment entitlement amount added to both wage adjustment entitlement amount added to fringe benefit adjustment entitlement amount, and wherein wage adjustment entitlement amount equals hourly pay rate changes for construction workers and service contract workers;

calculating a contract price adjustment entitlement when the contract price adjustment entitlement is selected from a group of contract price adjustment entitlements consisting of hourly wage rate changes and fringe benefit changes for a group of workers, wherein the group of workers is selected from workers consisting of construction workers and service contract workers, and construction workers together with service contract workers when the price adjustment proposal is absent hourly pay wage rate changes together with fringe benefit changes for construction workers and when the price adjustment proposal is absent hourly pay wage rate changes together with fringe benefit changes for service contract workers filtering a governing wage determination column for hourly pay rates and fringe benefits for construction workers;

initiating, automatically by the computer processor, pasting filtered hourly pay rates and fringe benefits for construction workers, when the contract price adjustment proposal contains hourly pay rates and fringe benefits for construction workers;

performing operations, automatically by the computer processor, selected from the group of operations consisting of activating calculate totals and populating calculated values, when the price adjustment proposal contains hourly pay rates and fringe benefits for workers selected from the group of workers consisting of construction workers and service contract workers;

opening and refreshing, automatically by the computer processor, a plurality of pivot tables when the price adjustment entitlement is selected from the group of price adjustment entitlements consisting of wage and fringe benefit adjustment entitlements and accompanying cost adjustment entitlements for workers from the group of workers consisting of construction workers and service contract workers and construction workers together with service contract workers; and generating an allowable and allocable contract price adjustment by the computer processor consistently applying a correct formula and transmitting the allowable and allocable contract price adjustment to the contractor in a contract modification or a request for a price adjustment proposal revision, wherein transmitting includes electronic communication over a communications network, conducted automatically by the computer processor.

2. The method according to claim 1, wherein the submission format for the contract price adjustment proposal is an electronic spreadsheet format.

3. The method according to claim 1, wherein hourly pay rates and fringe benefits for construction workers and hourly pay rates and fringe benefits for service contract workers are compensation for federal construction projects and federal service contract projects.

4. The method according to claim 1, further comprising initiating by use of an input device opening a spreadsheet, copying a plurality of data from the contract price adjustment proposal and pasting the plurality of data from the contract price adjustment proposal into the spreadsheet.

5. The method according to claim 1, wherein opening and refreshing the plurality of pivot tables, when the price adjustment proposal contains hourly pay rates and fringe benefits for construction workers, includes opening and refreshing an electronic line item pivot table, an employee pivot table and a wage determination pivot table.

6. The method according to clam 1, wherein a plurality of algorithmic expressions include providing a calculated total adjustment entitlement, characterized by a first formula:

$$=IF(E11\text{=``DBA''},\text{``see DB Breakout sheet''},(((H11-G11)+(J11-I11))*K11)+SUM(M11{:}O11));$$

applying correct contract law for one of DAVIS BACON ACT entries and SERVICE CONTRACT ACT entries, characterized by a second formula:

$$(((H11-G11)+(J11-I11))*K11)+SUM(M11{:}O11));$$
and calculating a DAVIS BACON ACT total hourly adjustment, characterized by a third formula:
IF((G11+I11)>=(H11+J11),O,(H11+J11)−(G11+I11),
wherein E11 represents governing wage determination, wherein H11 represents new required minimum wage, wherein G11 represents actual wages, wherein I11 represents actual fringe, wherein J11 represents fringe, wherein K represents number of hours, wherein M11 represents FICA, wherein N11 represents FUTA, and wherein O11 represents SUTA.

7. A system of determining contract price adjustments and screening for allowability and allocability of proposed adjustment entitlements, the system comprising:
- a computer processor having a display, an input device and an output device;
- a network interface communicatively coupling the computer processor to a network; and
- a memory having a dynamic repository, an algorithm unit and a program unit containing a computer readable and computer executable program; and
- a memory controller communicatively coupling the computer processor with contents of the dynamic repository, the algorithm unit and the computer readable and computer executable program residing in the program unit, wherein when executed by the computer processor, the computer readable and computer executable program causes the computer processor to perform the operations of:
  - receiving, by the computer processor in real time, a request from a contractor for contract price adjustment;
  - providing, to the contractor, a submission format for a contract price adjustment proposal and receiving the contract price adjustment proposal in the submission format from the contractor;
  - initiating copying a plurality of data from the contract price adjustment proposal;
  - initiating pasting the plurality of data from the contract price adjustment proposal into a reception format;
  - activating a first calculate total adjustment to payroll tax adjustment entitlement and total adjustment to workers compensation adjustment entitlement, wherein payroll tax adjustment entitlement together with workers compensation adjustment entitlement are elements of accompanying cost adjustment entitlement and total wage and fringe benefit adjustment entitlement, wherein total wage and fringe benefit adjustment entitlement is selected from a group of adjustment entitlements consisting of wage adjustment entitlement amount plus fringe benefit adjustment entitlement amount and wage adjustment entitlement amount added to fringe benefit adjustment entitlement amount separately calculated, and both wage adjustment entitlement amount plus fringe benefit adjustment entitlement amount added to both wage adjustment entitlement amount added to fringe benefit adjustment entitlement amount, and wherein wage adjustment entitlement amount equals hourly pay rate changes for construction workers and service contract workers;
  - calculating, in a first calculating operation, a contract price adjustment entitlement when the contract price adjustment entitlement is selected from a group of contract price adjustment entitlements consisting of hourly pay wage rate changes and fringe benefit changes for a group of workers, wherein the group of workers is selected from workers consisting of construction workers and service contract workers, and construction workers together with service contract workers when the price adjustment proposal is absent hourly pay wage rate changes together with fringe benefit changes for construction workers and when the price adjustment proposal is absent hourly pay wage rate changes together with fringe benefit changes for service contract workers;
  - filtering a governing wage determination column for hourly pay rates and fringe benefits for construction workers;
  - initiating copying a plurality of information including filtered hourly pay rates and fringe benefits for construction workers from a governing wage determination column;
  - initiating pasting filtered hourly pay rates and fringe benefits for construction workers, when the price adjustment proposal contains hourly pay rates and fringe benefits for construction workers;
  - performing operations selected from a group of operations consisting of activating a second calculate totals and populating calculated values, when the price adjustment proposal contains hourly pay wage rate changes and fringe benefit changes for a group of workers, wherein the group of workers is selected from workers consisting of construction workers and service contract workers when the price adjustment proposal is absent hourly pay rate changes together with fringe benefit changes for construction workers and when the price adjustment proposal is absent hourly pay wage rate changes together with fringe benefit changes for service contract workers;
  - opening and refreshing a plurality of pivot tables in a calculation tool when the price adjustment proposal contains hourly pay rates and fringe benefits for Davis Bacon Act workers OR Service Contract Act workers OR Davis Bacon Act workers together with Service Contract Act workers;
  - refreshing DAVIS BACON pivot hours and dollars per employee pivot tables and automatically organizing contractor data; and generating an allowable and allocable contract price adjustment and transmitting the allowable and allocable contract price adjustment to the contractor.

8. The system according to claim 7, wherein the submission format for the contract price adjustment proposal, received by the computer processor, is an electronic spreadsheet format.

9. The system according to claim 7, wherein hourly pay rates and fringe benefits for construction workers and hourly pay rates and fringe benefits for service contract workers, determined by the computer processor in the first determining operation, are compensation for federal construction projects and federal service contract projects.

10. The system according to claim 7, wherein opening and refreshing the plurality of pivot tables by the computer processor, when the price adjustment proposal contains hourly pay rates and fringe benefits for construction workers, includes opening and refreshing pivot tables consisting of an electronic line item pivot table, an employee pivot table and a wage determination pivot table and opening and refreshing the plurality of pivot tables further comprising refreshing a DAVIS BACON pivot hours & dollars ($) per employee pivot table and refreshing a DAVIS BACON adj & line item pivot table, for organizing contractor data.

11. The system according to claim 10, wherein further comprising refreshing, by the computer processor, the DAVIS BACON pivot hours & dollars ($) per employee pivot table and refreshing the DAVIS BACON adj & line item pivot table, includes determining, in a second determining operation, when hourly pay rates and fringe benefits for construction workers are contained in pivot tables selected from the group of pivot tables consisting of an electronic pivot table, an employee pivot table and a wage determination pivot table.

12. A non-transitory computer readable medium having a plurality of computer executable instructions executed by a computer processor causing the computer processor to perform a method of determining contract price adjustments and screening for allowability and allocability of proposed adjustment entitlements, the plurality of computer executable instructions including:
   instructions for receiving, by the computer processor, a request for a contract price adjustment;
   instructions of providing a submission format for a contract price adjustment proposal;
   instructions for receiving a contract price adjustment proposal in an electronic spreadsheet format from a contractor;
   instructions for storing the contract price adjustment proposal on the computer readable medium;
   instructions for copying, electronically, a plurality of data from the contract price adjustment proposal;
   instructions for pasting, the plurality of data from the contract price adjustment proposal, into a corresponding electronic spreadsheet reception format;
   instructions designating a calculate totals button for raw data wage health and welfare data;
   instructions for calculating automatically, total adjustment to payroll tax adjustment entitlement and total adjustment to workers compensation adjustment entitlement, wherein payroll tax adjustment entitlement together with workers compensation adjustment entitlement are elements of accompanying cost adjustment entitlement and total wage and fringe benefit adjustment entitlement by the computer processor executing the computer readable and executable program, wherein total wage and fringe benefit adjustment entitlement is selected from a group of adjustment entitlements consisting of wage adjustment entitlement amount plus fringe benefit adjustment entitlement amount and wage adjustment entitlement amount added to fringe benefit adjustment entitlement amount separately calculated, and both wage adjustment entitlement amount plus fringe benefit adjustment entitlement amount added to both wage adjustment entitlement amount added to fringe benefit adjustment entitlement amount, and wherein wage adjustment entitlement amount equals hourly pay rate changes for construction workers and service contract workers;
   instructions organizing, automatically, contractor data required for contract price adjustments;
   instructions of providing tips on each worksheet to determine allowable allocable and compliant contract price adjustments; and
   instructions for generating, by the computer processor executing the plurality of computer executable instructions residing on the computer readable medium, an allowable, allocable and compliant contract price adjustment calculation and transmitting over a communications network the allowable, allocable and compliant contract price adjustment calculation to the contractor.

13. The non-transitory computer readable medium according to claim 12, wherein the contract price adjustment proposal stored on the computer readable medium is stored in the electronic spreadsheet format.

14. The non-transitory computer readable medium according to claim 12, wherein hourly pay rates and fringe benefits for construction workers and hourly pay rates and fringe benefits for service contract workers are compensation for federal construction projects and federal service contract projects.

15. The non-transitory computer readable medium, according to claim 12, wherein the algorithmic expression causing the computer processor to automatically calculate payroll taxes and price adjustment entitlements includes a formula:
   If(E11="DBA",(IF((G11+I11)>=(H11+J11),0,(((H11+J11)−(G11+I11))*K11)+(SUM(M11:O11)))),IF(L11>1,((H11−G11*K11)+SUM(M11:O11),IF(L11+1,((H11−G11)+(J11−I11))*K11)+SUM(M11:O11))),
   wherein E11 represents governing wage determination, wherein +SUM(M11:O11))) represents specified allowable payroll taxes and workers compensation insurance costs, wherein L11 represents overtime scale, wherein H11 represents new required minimum wage, wherein G11 represents actual wages, wherein I11 represents actual fringe, wherein J11 represents fringe, wherein K represents number of hours, wherein M11 represents FICA, wherein N11 represents FUTA, and wherein O11 represents SUTA.

* * * * *